United States Patent
Ariga et al.

(10) Patent No.: US 6,879,617 B2
(45) Date of Patent: Apr. 12, 2005

(54) TWO STAGE LASER SYSTEM

(75) Inventors: Tatsuya Ariga, Hiratsuka (JP); Kyohei Seki, Hiratsuka (JP); Osamu Wakabayashi, Hiratsuka (JP)

(73) Assignees: Komatsu Ltd., Tokyo (JP); Ushio Denki Kabushiki Kaisya, Tokyo (JP); Gigaphoton Inc., Tokyo (JP)

( * ) Notice: Subject to any disclaimer, the term of this patent is extended or adjusted under 35 U.S.C. 154(b) by 142 days.

(21) Appl. No.: 10/438,737

(22) Filed: May 14, 2003

(65) Prior Publication Data

US 2004/0042521 A1 Mar. 4, 2004

(30) Foreign Application Priority Data

May 17, 2002 (JP) ..................................... 2002-142728

(51) Int. Cl.[7] ............................................... H01S 3/22
(52) U.S. Cl. ........................... 372/55; 372/56; 372/57; 372/58; 372/59; 372/60
(58) Field of Search ..................................... 372/55–60

(56) References Cited

U.S. PATENT DOCUMENTS

| | | | | | |
|---|---|---|---|---|---|
| 3,897,150 A | * | 7/1975 | Bridges et al. | ............ | 356/5.04 |
| 4,410,992 A | * | 10/1983 | Javan | ........................... | 372/32 |
| 4,881,231 A | * | 11/1989 | Jain | ............................. | 372/32 |
| 5,450,436 A | | 9/1995 | Mizoguchi et al. | ........... | 372/59 |
| 5,940,418 A | * | 8/1999 | Shields | ........................ | 372/22 |
| 6,381,257 B1 | * | 4/2002 | Ershov et al. | ................ | 372/57 |
| 6,526,086 B1 | * | 2/2003 | Wakabayashi et al. | ........ | 372/69 |
| 6,567,450 B2 | | 5/2003 | Myers et al. | ................. | 372/55 |
| 6,741,627 B2 | * | 5/2004 | Kitatochi et al. | ............. | 372/57 |
| 2004/0042521 A1 | * | 3/2004 | Ariga et al. | .................. | 372/55 |

FOREIGN PATENT DOCUMENTS

JP     2001-024265     1/2001

* cited by examiner

*Primary Examiner*—Minsun Oh Harvey
*Assistant Examiner*—Delma R. Flores-Ruiz
(74) *Attorney, Agent, or Firm*—Dellett & Walters

(57) ABSTRACT

The present invention relates to a two stage laser system in which a desired spectral line width can be obtained at high output even when the integrated spectral characteristic of oscillator laser does not have the desired spectral line width, comprising an oscillator laser device 10 which has discharge electrodes 2 within a laser chamber 1 filled with laser gas containing $F_2$ and emits laser beam which is band-narrowed by means of a band narrowing module 3 arranged in a laser resonator, and an amplifier laser device 20 which has discharge electrodes 2 within a laser chamber 1 filled with laser gas containing $F_2$ and amplifies laser pulse injected from said oscillator laser device 10. In the system, a synchronous time interval having a predetermined spectral line width exists in laser pulse from the oscillator laser 10, and the system is set such that a discharge occurs in the amplifier laser 20 within the synchronous time interval.

17 Claims, 24 Drawing Sheets

Time Point
(Time Origin: Starting Point of Sidelight Rise)

Time Point
(Time Origin: Starting Point of Sidelight Rise)

TWO STAGE LASER SYSTEM

BACKGROUND OF THE INVENTION

The present invention relates to a two stage laser system in which two or more lasers including oscillator laser and amplifier laser are used, and more specifically, to a two stage laser system such as an injection locking laser system or an MOPA system, wherein a desired spectral line width or a spectral purity can be obtained at high output even when the integrated spectral characteristic of oscillator laser does not have a desired spectral line width or a spectral purity.

As the integrated circuits become finer and higher integrated, improvement of resolution has been demanded in exposure devices for use in fabrication of the integrated circuits. Consequently, the wavelength of exposure light emitted from the exposure light source has been driven to shorter wavelength, and exposure light sources such as KrF laser device with a wavelength of 248 nm or ArF laser device with a shorter wavelength of 193 nm have begun to be utilized as exposure light source for semiconductor, in place of conventional Hg lamp.

Further, in the exposure technique to realize semiconductor integrated circuit with a line width of 70 nm or narrower on semiconductor base, an exposure light source having a wavelength of 160 nm or shorter is demanded. At present, an $F_2$ (fluorine molecule) laser device emitting ultraviolet light with a wavelength around 157 nm is regarded as promising light source for this purpose.

The $F_2$ laser device ($\lambda_1$=157.6299 nm, $\lambda_2$=157.5233 nm: Sov. J. Quantum Electron. 16 (5), May 1986) has a spectral FWHM (Full Width at Half Maximum) of about 1 pm. The intensity ratio of the above two oscillation lines $I(\lambda_1)/I(\lambda_2)$ is about 7. Typically, the oscillation line with the wavelength $\lambda_1$(=157.6299 nm) having larger intensity is used in the exposure.

Exposure technique is roughly divided into two types as below.

1) Dioptric System
2) Catadioptric System

As to the catadioptric system, occurrence of the chromatic aberration is suppressed when this type of optical system is used in the exposure technique. Therefore, exposure device based on the catadioptric system is regarded as promising at present in the wavelength region around 157 nm. However, the catadioptric system has more difficulty in adjustment of the optical axis of exposure device in comparison with conventional dioptric systems.

On the other hand, the dioptric system is a projection optical system generally used in conventional exposure devices. In the exposure technique, the method to correct the chromatic aberration in the optical system is an important problem. In the dioptric system, the chromatic aberration correction has been achieved by combining a plurality of optical elements such as lenses with different refractive indexes. There is however limitation in available kind of optical material having transparency in the wavelength region around 157 nm, and the only available material is $CaF_2$ (fluorite) at present.

Accordingly, a band narrowing is required to an $F_2$ laser device which is used as light source for the dioptric exposure device. Specifically, it is required to band-narrow the spectral FWHM of the laser beam to a line width of 0.2 pm or narrower. In KrF laser device and ArF laser device, band narrowing is also required because laser beam of these devices has a spectral FWHM as broad as several hundred nm in free running operation without band narrowing.

Meanwhile, the average output required to an $F_2$ laser device which is used as exposure light source is, for example, 20 W. Thus, when the repetition frequency of a laser device is 2 kHz, the pulse energy per pulse is 10 mJ, and when the repetition frequency of a laser device is 4 kHz, the pulse energy per pulse is 5 mJ.

However, when for instance an etalon is arranged within laser resonator as band narrowing means, it was difficult to have laser output of 5–10 mJ because of damage to coating on etalon, requiring the use of etalon without coating. This hindered the narrowing of the spectral line width. Further, abundant ASE (Amplified Spontaneous Emission) component limited the line width to over 0.4 to 0.6 pm. Consequently, it was difficult to achieve the band narrowing at a pulse energy level of 5 to 10 mJ.

Problems similar to the above also arise in KrF laser device and ArF laser device, when a high power is required.

In the abovementioned situation, in order to obtain a laser beam with a spectral line width of 0.2 pm or narrower and with a pulse energy of 5 mJ or higher, a two stage laser system comprising an oscillator laser and an amplifier laser may be employed.

Thus, an oscillator laser generates a laser beam having a spectral line width of 0.2 pm or narrower at a low output level, which is amplified in an amplifier laser to provide a laser beam having a spectral line width of 0.2 pm or narrower and a pulse energy of 5 mJ or higher. A similar construction may be employed also in KrF laser device and ArF laser device which are designed to have high power and narrow band.

Construction examples of two stage laser system include injection locking system and MOPA (Master Oscillator Power Amplifier) system. In construction of the injection locking system, a laser resonator is provided in the oscillator laser, and an unstable resonator is used in the amplifier laser. The construction of MOPA system does not have laser resonator in the amplifier laser. In the MOPA system having no laser resonator in the amplifier laser, the amplifier laser functions as a one pass amplifier of laser beam from the oscillator laser.

As band-narrowing element for the oscillator stage, a combination of prism group comprising one or more enlargement/dispersion prisms and grating, or a combination of etalon and total reflection mirror is used.

In FIG. 20 and FIG. 21, constructions of two stage laser systems according to conventional technique are shown. FIG. 20 shows a construction example of a MOPA system, and FIG. 21 shows a construction example of an amplifier laser in an injection locking system. For the oscillator laser in the construction of FIG. 21, a similar one as in FIG. 20 is used.

FIG. 20 schematically shows the device in top view. A laser beam emitted from an oscillator laser 10 functions as a seed laser beam in the laser system. An amplifier laser 20, 20' has a function to amplify the seed laser light. Thus, the spectral characteristic of the entire laser system is determined by the spectral characteristic of the oscillator laser 10. The laser output (energy or power) of the laser system is determined by the output of the amplifier laser 20, 20'.

When a two stage laser system comprises an $F_2$ laser device, chambers 1 of both oscillator laser 10 and amplifier laser 20, 20' are filled with laser gas consisting of fluorine ($F_2$) gas and buffer gas including helium (He) gas and neon (Ne) gas. When a two stage laser system comprises a KrF laser device, chambers 1 of both oscillator laser 10 and amplifier laser 20, 20' are filled with a laser gas consisting of krypton (Kr) gas, fluorine ($F_2$) gas and buffer gas including helium (He) gas and neon (Ne) gas. When a two stage laser system comprises an ArF laser device, chambers 1 of both oscillator laser 10 and amplifier laser 20, 20' are filled with a laser gas consisting of argon (Ar) gas, fluorine ($F_2$) gas and buffer gas including helium (He) gas and neon (Ne) gas.

The laser chamber 1 has a discharging part therein. The discharging part comprises a pair of electrodes 2, cathode and anode, arranged in line along the direction perpendicular to the paper surface. By applying a high voltage pulse to the pair of electrodes 2 from power supplies 7, 7', a discharge occurs between the electrodes 2. In FIG. 20 and FIG. 21, only an upper electrode 2 is shown.

At both ends of the extension of light axis extending between the electrodes 2 provided in the chamber 1, window members 11 are provided respectively which are made of material transparent to oscillated laser light such as $CaF_2$. Here, each window member 11 has a backside surface relative to the chamber 1 (outside surface), the two surfaces being arranged in parallel to each other and at a Brewstar angle in order to decrease a reflection loss.

In addition, a cylindrical fan (cross-flow fan) which is not shown in FIG. 20 and FIG. 21 is provided in the chamber 1 to circulate laser gas within the chamber 1 and to force laser gas through discharging part. Further, in the device of FIG. 20 and FIG. 21, both oscillator laser 10 and amplifier laser 20, 20' have an $F_2$ gas supply system and a buffer gas supply system to supply $F_2$ gas and buffer gas to the chamber 1, and also have an exhaust system to exhaust laser gas from the chamber, but these are also not shown. Likewise, in case of a KrF laser device or an ArF laser device, Kr gas supply systems and Ar gas supply systems are provided, respectively.

The oscillator laser 10 comprises a band narrowing module 3 consisting of enlargement prism 4 and a grating (diffraction grating) 5. These optical elements in the band narrowing module 3 cooperate with a front mirror 6 to compose a laser resonator. Alternatively, a band narrowing module employing an etalon and a total reflection mirror in place of the enlargement prism and the grating may be used, but not shown. Further, as shown in FIG. 22, a band narrowing module 3 of a combined construction using a wave length selection module comprising an etalon 12 and a grating 5 may also be used.

The laser beam from the oscillator laser 10 (the seed laser beam) is guided and injected to the amplifier laser 20, 20' by means of a beam transmission system including a reflection mirror which is not shown. In an injection locking system shown in FIG. 21, an unstable type resonator having, for instance, a 3× (three-power) magnification or larger is employed in the amplifier laser 20' in order to allow even a low level input to be amplified.

A hole 13 is formed in a rear mirror 8 of the unstable resonator of the amplifier laser 20' of the injection locking system. The seed laser beam passing this hole 13 is reflected as shown in FIG. 21. The injected laser beam is enlarged and effectively passes through the discharging part to have an increased laser beam power. The laser beam is finally emitted through a front mirror 9. An HR (High Reflection) coat is applied on the periphery of the rear mirror 8 which is provided at the center part with a spatial hole 13 as described above. The front mirror 9 has a HR coat applied on the center part of the convex mirror, and an AR (Anti Reflection) coat applied on a laser emitting part in the periphery.

A mirror base having an AR coat applied only on the hole part of a concave mirror may be used in place of the concave mirror 8 having the spatial hole 13. Further, an unstable resonator having no transparent part in the mirror may also be used.

In case of the $F_2$ laser device, He gas, Ne gas, or a mixture of them is used as buffer gas in both the oscillator laser 10 and the amplifier laser 20, 20'. In addition, Xe gas may be added, if necessary.

A synchronous controller 21 controls the discharge timing of the oscillator laser 10 and the amplifier laser 20, 20'. First, it sends a trigger signal to the power supply 7 of the oscillator laser 10 as an ON command by which a high voltage pulse is applied to a pair of electrodes 2 of the oscillator laser 10 from the power supply 7. After a predetermined time interval, it sends a trigger signal as an ON command to the power supply 7' of the amplifier laser 20, 20'.

The above described predetermined time interval means a time interval for synchronizing a timing at which the seed laser light is injected from the oscillator laser 10 to the amplifier laser 20, 20' with a timing at which the amplifier laser 20, 20' discharges.

As previously described, in the aforementioned two stage laser system, the spectrum characteristic of the entire laser system is determined by the spectrum characteristic of the oscillator laser. In an ultra narrow band oscillator laser having a line width of, for instance, 0.2 pm, the device has been conventionally constructed in such a manner that an integrated spectrum characteristic gives a desired characteristic (such as line width and purity).

In the following, the integrated spectrum characteristic will be described in outline. A laser beam emitted from the oscillator laser reciprocates within the laser resonator including the front mirror and the band narrowing module, until a part of it is extracted through the front mirror. Accordingly, the trailing half of the laser pulse has a narrower band than the leading half, since the trailing half reciprocates in the laser resonator more number of times, passing through the band narrowing module more number of times than the leading half. That is, the spectral waveform varies depending on time point within a laser pulse. Therefore, the spectrum characteristic has been evaluated by an integrated spectrum characteristic derived from a time-integration of each spectral waveform at each time point in a laser pulse.

In the situation as described above, in case of the $F_2$ laser device, Ne gas or Ne rich mixture gas of Ne gas and He gas has been utilized as buffer gas contained in laser gas for the oscillator laser. This is due to the following reasons.

When He gas is used as buffer gas contained in laser gas for the oscillator laser, laser gain is larger than that in case of Ne gas, which leads to the generation of ASE. As the result, the ASE component is contained in the integrated spectral waveform of laser pulse emitted from the oscillator laser. Spectral line width (FWHM) of the ASE component depends on the laser gas total pressure and is 0.8 pm or larger. Since the ASE is a light emitted in one pass without reciprocating in the laser resonator, the ASE does not pass through the band narrowing module. Consequently, even if the band-narrowing of the laser beam emitted from the oscillator laser was carried out by means of the band narrowing module in the laser resonator, it was impossible to have a spectral line width (FWHM) of 0.8 pm or narrower in the integrated spectral waveform of a laser pulse because of the ASE component.

For this reason, mainly Ne gas has been used as buffer gas contained in laser gas for the oscillator laser, as it gives less laser gain and is less subject to ASE generation in comparison with He gas.

However, when Ne buffer gas is used, there arises a problem that high repetition rate is difficult. Due to a difference in gas characteristics such as discharge resistance, Ne gas is more subject to field concentration during discharge in comparison with He gas, which leads to an unstable discharge especially in high repetition rate. Further, since the Ne gas has heavier mass than that of He gas, it is difficult to allow high rate circulation of gas in the laser chamber by cross flow fan. Consequently, the gas replacement of the discharge region which is effected by gas circulation between discharges becomes insufficient in high repetition rate, which also leads to an unstable discharge.

Especially, a high repetition rate of 4 kHz or higher is difficult to be achieved with the present discharge technique in gas circulation system, discharge circuit, power supply, and the like.

Now, the inventors of the present application have found a relationship as described in the following between the light generated by laser gas excited by discharge between a pair of electrodes and the laser pulse rise occurring afterward (Japanese Patent Application No. 2002-46328).

FIGS. 23(a) and 23(b) are graphs each showing a laser pulse waveform, a sidelight waveform, and a spectral line width in a laser pulse in time sequence. FIG. 23(a) and FIG. 23(b) show different sidelight waveforms. The constructions of band narrowing module and laser resonator in both FIG. 23(a) and FIG. 23(b) are the same. Here, "sidelight" refers to a light generated by laser gas excited by discharge between a pair of electrodes. The observation of sidelight is performed from a position offset from the laser resonator (for instance, from an observation window arranged beside an electrode in a direction nearly perpendicular to the longitudinal direction of the electrode).

From the comparison between FIG. 23(a) and FIG. 23(b), it is obvious that the ASE component does not exist in the laser waveform when the sidelight rise (that is, the laser gain rise) is slow.

The reason why the ASE component is suppressed when the sidelight rise (the laser gain rise) is slow is thought to be as follows. In the case of FIG. 23(b), the sidelight rise (the laser gain rise) is so quick that the light generated by discharge is quickly amplified and is taken out of the laser resonator as ASE without reciprocation in the laser resonator, before it surpasses a predetermined threshold value to be taken out of the laser resonator as a laser beam.

On the other hand, in the case of FIG. 23(a), the sidelight rise (the laser gain rise) is delayed and the light generated by discharge is slowly amplified. The light reciprocates in the laser resonator without being amplified quickly and taken out of the resonator as ASE, and after it has grown up to surpass the threshold value, it is taken out of the resonator as laser beam. Thus, ASE component does not exist in the light emitted from the laser device.

It has become obvious from the comparison between FIG. 23(a) and FIG. 23(b), that ASE component does not exist when the sidelight rise (that is, the laser gain rise) is slow.

Here, by combining the time sequences of the spectral line width and the laser pulse waveform in FIG. 23(a) and FIG. 23(b), FIG. 24 is obtained.

FIG. 24 shows that the time sequences of the spectral line width of FIG. 23(a) and FIG. 23(b) are approximately on a same curve. The spectral line width of FIG. 23(a) at the time point where the laser pulse waveform of FIG. 23(a) rises up is substantially the same with the spectral line width of FIG. 23(b) at the same time point.

It is thought that this is because, until the light reciprocating in the laser resonator before the light generated after the start of discharge is taken out of the laser resonator (before the laser pulse rise), the light passes the band narrowing module several times and therefore laser beam is already band-narrowed by a certain degree.

Specifically, it is thought that the light generated at the start of discharge receives a band-narrowing and gradually decreases its spectral line width already before the laser pulse rise, and it continues to decrease gradually its spectral line width after the laser pulse rise until the laser pulse disappears. This phenomenon will be referred to hereinafter as line width characteristic. In addition, a time sequence of the spectral purity (purity characteristic) is also thought to have similar characteristic as line width characteristic, decreasing its width with the lapse of time.

It has been found from the experiments of the inventors of the present application that the line width characteristic and the purity characteristic mainly depend on the length of the laser resonator and band narrowing performance of the band narrowing module. Accordingly, it has been made clear that the spectral line width (integrated value) can be narrowed to a predetermined width and the spectral purity can be improved to a predetermined level, by controlling the sidelight rise (the laser gain rise) in such a manner that the laser pulse rise occurs after the light within the laser resonator has been band-narrowed to a predetermined spectral line width.

In addition, it has been made clear as is shown in FIG. 23(a) and FIG. 23(b), that the ASE generation can be suppressed by controlling the sidelight rise.

Based on the novel knowledge as described above, a conventional example will be discussed.

FIG. 25 is an illustration showing a relationship between a waveform of a band-narrowed laser pulse and a spectral line width variation (line width characteristic) of a light generated after the start of discharge (after the start of a sidelight emission), when the sidelight rise is regarded as the starting point (time origin). As described above, the decrease of the spectral line width with the lapse of time from the starting point of the sidelight is explained by the fact that the band narrowing proceeds even before the laser pulse rise because of frequent reflection of under-threshold laser gain in the band narrowing module.

For convenience of explanation, a time point after generation of the sidelight, at which point the line width falls below a desired width A is assumed as time point T1. In conventional technique, the spectral waveform was evaluated by the integrated spectral waveform. Accordingly, a laser pulse (generated after the time point T1) having a spectral line width narrower than A throughout the laser pulse was employed as seed laser beam in a two stage laser system. In this manner, a desired spectral characteristic (line width or purity) has been achieved.

As the time point T1 is determined depending on the line width characteristic regarding the starting point of the sidelight as time origin, T1 is determined by the discharge timing (starting point of the sidelight) of the oscillator laser. In conventional technique in which integrated spectral waveform was used, the laser gas condition, discharge circuit, or other conditions were adjusted so that the laser pulse always occurs after T1. Further, as described above, Ne gas or Ne rich mixture of rare gas was conventionally used as buffer gas because such knowledge as suppressing of ASE generation by delaying the sidelight rise was not available.

The synchronous controller stored data of a time interval between sending of trigger signal to the power supply of the oscillator laser and the laser pulse rise, and of a laser pulse width, and it controlled the discharge timing of the amplifier laser by sending trigger signal to the power supply of the amplifier laser in such a manner that the sidelight rise of the amplifier laser occurs (that is, discharge occurs) in a time interval during the oscillator laser pulse lasts (time interval $T_{SYC}$).

Here, the time interval between sending of trigger signal to the power supply of the oscillator laser and the laser pulse rise, and the value of laser pulse width are obtained beforehand from such factors as state of laser gas and conditions of band narrowing module and discharge circuit.

In addition, it is supposed in the above description that laser pulse width and $T_{SYC}$ are substantially the same, but in practice the momentary laser power in the oscillator laser pulse is required to have such an intensity that a sufficient laser amplification can be performed in a two stage laser system. Accordingly, in the example of FIG. 25, the starting point of $T_{SYC}$ is later than the time point of laser pulse rise, and the end point of $T_{SYC}$ is earlier than the end point of the laser pulse.

As described above, in the past, the knowledge of delaying ASE generation by delaying the sidelight rise was not known, and the spectral waveform was evaluated by the integrated spectral waveform, which required the use of Ne gas or Ne rich rare gas as buffer gas. Therefore, it was difficult to achieve a high repetition rate pulse oscillation as discussed in the above.

SUMMARY OF THE INVENTION

The present invention has been made in view of the state of the prior art as described above, and it is an object of the present invention to provide a two stage laser system in which two or more lasers such as $F_2$ laser devices are used as oscillator laser and amplifier laser, wherein a desired spectral line width or a desired spectral purity can be obtained at a desired high output even when the integrated spectral characteristic of the oscillator laser does not have a desired spectral line width or a desired spectral purity.

In order to achieve the above described object, the present invention provides a first two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a synchronous time interval ($T_{SYC}$) having a predetermined spectral line width (FWHM) and/or a predetermined spectral purity exists in the laser pulse from said oscillator laser device, and the system is set such that a discharge occurs in said amplifier laser device within said synchronous time interval ($T_{SYC}$).

The present invention provides a second two stage laser system which corresponds to the algorithm of a first and a second embodiments described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein when a time point at which an emission occurs caused by a discharge in said oscillator laser device (sidelight starting point) is regarded as time origin, a time point of laser pulse generation relative to said time origin and a laser pulse width in said oscillator laser device are set such that a previously determined synchronous time interval ($T_{SYC}$) substantially coincides with an actual synchronous time interval ($T_{SYC}$) within which a time point having a predetermined spectral line width (FWHM) and/or a predetermined spectral purity exists in the laser pulse from said oscillator laser device, and the system is set such that a discharge occurs in said amplifier laser device within said previously determined synchronous time interval ($T_{SYC}$).

The present invention provides a third two stage laser system which corresponds to the algorithm of a first and a second embodiments described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has a discharge electrodes within a laser chamber filled with laser gas containing $F_2$ and amplifies the laser pulse injected from said oscillator laser device, wherein said oscillator laser device comprises a discharge emission measuring device (sidelight sensor), a laser pulse measuring device (laser pulse sensor) which measures a time-related pulse waveform of laser beam, and a first controller (laser pulse controller) which can control at least one of applied voltage to the discharge electrodes, fluorine concentration in laser gas, and laser gas pressure in said oscillator laser device, said amplifier laser device comprises a second controller (synchronous controller) which controls the discharge generation in said amplifier laser device, said first controller uses the data from said discharge emission measuring device and the data from said laser pulse measuring device to set a laser pulse generation time point relative to a time origin and a laser pulse width in said oscillator laser device, said time origin being a time point at which an emission occurs caused by a discharge in said oscillator laser device (sidelight starting point), by controlling at least one of applied voltage to the discharge electrodes, fluorine concentration in laser gas, and laser gas pressure in said oscillator laser device, said setting being made in such a manner that a predetermined synchronous time interval ($T_{SYC}$) substantially coincides with an actual synchronous time interval ($T_{SYC}$) within which a time point having a predetermined spectral line width (FWHM) and/or a predetermined spectral purity exists in the laser pulse from said oscillator laser device, and said second controller controls such that a discharge occurs in the amplifier laser device within said previously determined synchronous time interval ($T_{SYC}$).

The present invention provides a fourth two stage laser system corresponding to the algorithm of a variation of the first embodiment described later, wherein the control by said first controller and the control by said second controller are performed in parallel in said third two stage laser system.

The present invention provides a fifth two stage laser system corresponding to a variation of the first embodiment described later, wherein after the control by said first controller is performed for a predetermined time interval, the control by said first controller and the control by said second controller are performed in parallel.

The present invention provides a sixth two stage laser system corresponding to the second embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device (sidelight sensor), a laser pulse measuring device (laser pulse sensor) which measures a time-related pulse waveform of laser beam, and a first controller (laser pulse controller) which can control at least one of applied voltage to the discharge electrodes, fluorine concentration in laser gas, and laser gas pressure in said oscillator laser device, said amplifier laser device comprises a laser spectrum sensor which detects spectral line width (FWHM) and/or spectral purity of a laser pulse projected from the amplifier laser and a second controller (synchronous controller) which controls the discharge generation in said amplifier laser device, said first controller uses the data from said discharge emission measuring device and the data from said laser pulse measuring device to set a laser pulse generation time point relative to a time origin and a laser pulse width in said oscillator laser device, said time origin being a time point at which an emission occurs caused by a discharge in said oscillator laser device (sidelight starting point), by controlling at least one of applied voltage to the discharge electrodes, fluorine concentration in laser gas, and laser gas pressure in said oscillator laser device, said setting being made in such a manner that a previously determined synchronous time interval ($T_{SYC}$) substantially coincides with an actual synchronous time interval ($T_{SYC}$) within which a time point having a predetermined spectral line width (FWHM) and/or a predetermined spectral purity exists in the laser pulse from said oscillator laser device, after said setting, said second controller controls such that a discharge occurs in said amplifier laser device within said previously determined synchronous time interval ($T_{SYC}$), and when detected data of said laser spectrum sensor is not at a predetermined value or it is outside a predetermined range, said first controller resets said setting of the laser pulse from said oscillator laser device.

The present invention provides a seventh two stage laser system corresponding to the second embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device (sidelight sensor), a laser pulse measuring device (laser pulse sensor) which measures a time-related pulse waveform of laser beam, and a first controller (laser pulse controller) which can control at least one of applied voltage to the discharge electrodes, fluorine concentration in laser gas, and laser gas pressure in said oscillator laser device, said amplifier laser device comprises a laser spectrum sensor which detects spectral line width (FWHM) and/or spectral purity of laser pulse projected from the amplifier laser and a second controller (synchronous controller) which controls the discharge generation in said amplifier laser device, said first controller uses the data from said discharge emission measuring device and the data from said laser pulse measuring device to set a laser pulse generation time point relative to a time origin and a laser pulse width in said oscillator laser device, said time origin being a time point at which an emission occurs caused by a discharge in said oscillator laser device (sidelight starting point), by controlling at least one of applied voltage to the discharge electrodes, fluorine concentration in laser gas, and laser gas pressure in said oscillator laser device, said setting being made in such a manner that a previously determined synchronous time interval ($T_{SYC}$) substantially coincides with an actual synchronous time interval ($T_{SYC}$) within which a time point having a predetermined spectral line width (FWHM) and/or a predetermined spectral purity exist in the laser pulse from said oscillator laser device, after said setting, said second controller controls such that a discharge occurs in said amplifier laser device within said previously determined synchronous time interval ($T_{SYC}$), and when detected data of said laser spectrum sensor is not at a predetermined value or it is outside a predetermined range, said first controller sends an abnormality signal to the outside.

The present invention provides an eighth two stage laser system corresponding to a third embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a laser pulse generation time point relative to a discharge emission time point and a spectral line width are set such that a time point having a predetermined spectral line width and/or a predetermined spectral purity exists within the laser pulse from said oscillator laser device, a synchronous time interval ($T_{SYC}$) within which a time point having a predetermined spectral line width and/or a predetermined spectral purity exists is determined in the laser pulse which is set in said manner, and the system is set such that a discharge occurs in said amplifier laser device within said synchronous time interval ($T_{SYC}$).

The present invention provides a ninth two stage laser system corresponding to the third embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device (sidelight sensor), a laser pulse measuring device (laser pulse sensor) which measures a time-related pulse waveform of laser beam, and a first controller (laser pulse controller) which can control at least one of applied voltage to the discharge electrodes, fluorine concentration in laser gas, and laser gas pressure in said oscillator laser device, said amplifier laser device comprises a second controller (synchronous controller) which controls the discharge generation in said amplifier laser device, said first controller uses the data from said discharge emission measuring device and the data from said laser pulse measuring device to set a laser pulse generation time point relative to a discharge emission time point and a laser pulse width in said oscillator laser device, by controlling at least one of applied voltage to the discharge electrodes, fluorine concentration in laser gas, and laser gas pressure in said oscillator laser device, said setting being made in such a manner that a time point having a predetermined spectral line width (FWHM) and/or a predetermined spectral purity exists in the laser pulse from said oscillator laser device, said first controller then determining a synchronous time interval ($T_{SYC}$) within which a time point having a predetermined spectral line width and/or a predetermined spectral purity exists in laser pulse which is set in said manner, and sending the data of the synchronous time interval ($T_{SYC}$) to said second controller, and said second controller controls such that a discharge occurs within said synchronous time interval ($T_{SYC}$) in said amplifier laser device, based on the synchronous time interval data from said first controller.

The present invention provides a tenth two stage laser system corresponding to a fourth embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a pulse energy of the laser beam emitted from said oscillator laser is maintained at a predetermined value, said synchronous time interval is determined from operation conditions of said oscillator laser device based on a correlation table between at least one operation condition of applied voltage to the discharge electrode, fluorine concentration in laser gas, and laser gas pressure in said oscillator laser device, and a synchronous time interval ($T_{SYC}$) within which a time point having a predetermined spectral line width and/or a predetermined spectral purity exists within the laser pulse from said oscillator laser device, and the system is set such that a discharge occurs in said amplifier laser device within said synchronous time interval ($T_{SYC}$).

The present invention provides an eleventh two stage laser system corresponding to the fourth embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a first controller (laser pulse controller) and a laser pulse sensor which measures a pulse energy of laser beam, said amplifier laser device comprises a second controller (synchronous controller) which controls the discharge generation in said amplifier laser device, a correlation table between at least one operation condition of applied voltage to the discharge electrode, fluorine concentration in laser gas, and laser gas pressure in said oscillator laser device, and a synchronous time interval ($T_{SYC}$) within which a time point having a predetermined spectral line width and/or a predetermined spectral purity exists in the laser pulse from said oscillator laser device is stored in said second controller, said first controller controls at least one of applied voltage to the discharge electrode, fluorine concentration in laser gas, and laser gas pressure in said oscillator laser device to maintain the pulse energy of the laser beam emitted from said oscillator laser device at a predetermined value, said first controller then sending at least one of the operation condition data of applied voltage to the discharge electrode, fluorine concentration in laser gas, and laser gas pressure in said oscillator laser device to said second controller, and said second controller determines a synchronous time interval ($T_{SYC}$) from operation data from said first controller and said correlation table and controls said amplifier laser device such that a discharge occurs in said amplifier laser device within this synchronous time interval ($T_{SYC}$).

The present invention provides a twelfth two stage laser system corresponding to a fifth embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a time region within which a predetermined level of momentary energy is surpassed in the laser pulse from said oscillator laser device is determined, and a laser pulse generation time point relative to a discharge emission time point and a laser pulse width are set such that a time point having a predetermined spectral line width (FWHM) and/or a predetermined spectral purity exists in this time region, a synchronous time interval ($T_{SYC}$) within which a time point having a predetermined spectral line width and/or a predetermined spectral purity exists is determined in the laser pulse which is set in said manner, and the system is set such that a discharge occurs in said amplifier laser device within said synchronous time interval ($T_{SYC}$).

The present invention provides a thirteenth two stage laser system corresponding to the fifth embodiment described later, the system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device (sidelight sensor), a laser pulse measuring device (laser pulse sensor) which can measure a time-related pulse waveform of laser beam, and a first controller (laser pulse controller) which can control at least one of applied voltage to the discharge electrodes, fluorine concentration in laser gas, and laser gas pressure in said oscillator laser device, said amplifier laser device comprises a second controller (synchronous controller) which controls the discharge generation of said amplifier laser device, said first controller uses the data from said discharge emission measuring device and the data from said laser pulse measuring device to determine a time region within which a predetermined level of momentary energy is surpassed in the laser pulse from said oscillator laser device and to set a laser pulse generation time point relative to a discharge emission time point and a laser pulse width in said oscillator laser device, by controlling at least one of applied voltage to the discharge electrodes, fluorine concentration in laser gas, and laser gas pressure in said oscillator laser device, said setting being made in such a manner that a time point having a predetermined spectral line width (FWHM) and/or a predetermined spectral purity exists in said time region, said first controller then determining a synchronous time interval ($T_{SYC}$) within which a time point having a predetermined spectral line width and/or a predetermined spectral purity exists in the laser pulse which is set in said manner, and sending the data of the synchronous time interval ($T_{SYC}$) to said second controller, and said second controller controls such that a discharge occurs in said amplifier laser device within said synchronous time interval ($T_{SYC}$), based on the synchronous time interval data from the first controller.

In above described first through thirteenth two stage laser system of the present invention, it is preferable that a discharge occurs in said amplifier laser device at a time point of ½ of said synchronous time interval ($T_{SYC}$).

In above described first through fourteenth two stage laser system of the present invention, the laser system may comprise any one of KrF laser device, ArF laser device, and $F_2$ laser device.

In this case, said two stage laser system may comprise a $F_2$ laser device, and helium gas may be used as buffer gas in laser gas in said oscillator laser device.

In addition, in above described system, said two stage laser system may comprise a $F_2$ laser device, and the applied voltage to the discharge electrode of said amplifier laser device is preferably 20 kV or higher, and the laser gas pressure is preferably in a range of 2500–4000 hPa.

According to the present invention, in a two stage laser system such as injection locking laser system or MOPA system in which two or more lasers including oscillator laser and amplifier laser are used, a synchronous time interval having a predetermined spectral line width and/or a predetermined spectral purity exists in the laser pulse from the oscillator laser, and the system is set such that a discharge occurs in the amplifier laser device within this synchronous time interval, which setting yields a desired spectral line width or a spectral purity at a desired high output even when the integrated spectral characteristic of the oscillator laser does not have the desired spectral line width or spectral purity. Especially in $F_2$ laser device, the use of He buffer gas in ultra narrow band oscillator laser becomes possible.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, the basic principle of the present invention and embodiments based on it will be described.

In the present invention, based on a previously found knowledge that, as described above, the spectral line width (integrated value) can be narrowed to a predetermined value and also the spectral purity can be improved by controlling the sidelight rise (laser gain rise) in such a manner that the laser pulse rise occurs after the light in the laser resonator has been band-narrowed to a predetermined spectral line width, and that also ASE generation can be suppressed by controlling the sidelight rise, a two stage laser system is controlled as described in the following.

Studying the line width characteristic in further detail, the inventors of the present application have obtained the following knowledge. Specifically, it has been made clear by experiments for the first time that the line width characteristic is almost determined by the state of buffer gas used in the oscillator laser, the characteristic of band narrowing module being used, and the laser resonator length. That is, if the laser rise time is changed by changing $F_2$ concentration in laser gas, total pressure of laser gas, or the applied voltage to a pair of main electrodes, no change in the line width characteristic takes place. The same is true in the purity characteristic which is a time sequence of the spectral purity.

Figure 26:
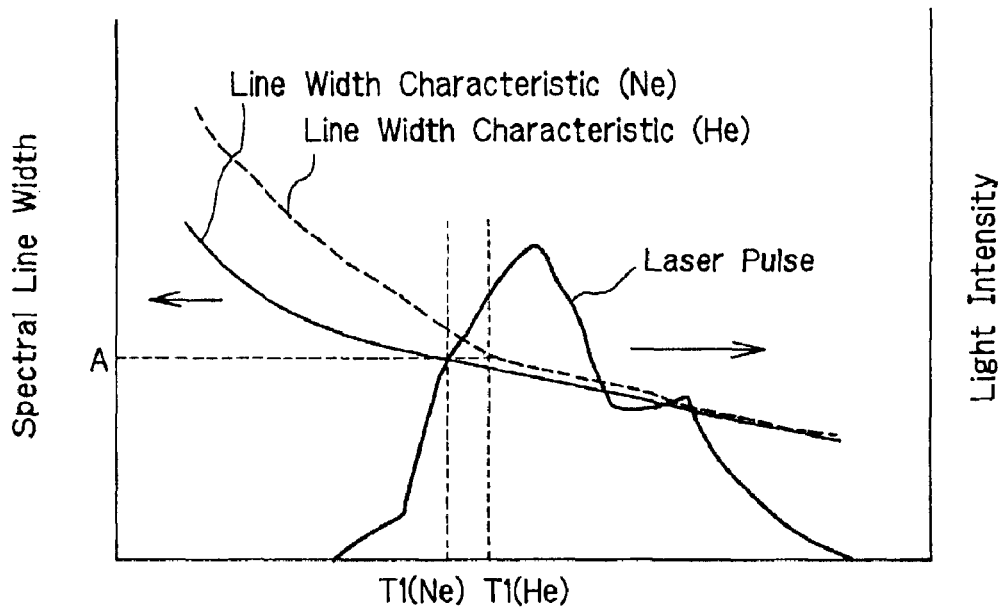
FIG. 26 is a graph for explaining a possibility of determining from a spectral line width characteristic a time point T1 at which a desired spectral line width A is obtained.

From this line width characteristic, a time point T1 at which a desired spectral line width A (for example, 0.2 pm) is obtained can be determined beforehand as shown in FIG. 26. Thus, a laser beam with a predetermined spectral line width can be obtained by controlling in such a manner that the oscillator laser pulse exists at and after the time point T1 and starting the discharge of the amplifier laser when the seed laser light generated at and after the time point T1 is injected from the oscillator laser. In addition, FIG. 26 shows the line width characteristics for both cases of using Ne gas and of using He gas as buffer gas in the oscillator laser. It is seen that the time point T1 at which a spectral line width A is obtained varies depending on the kind of buffer gas.

Figure 27A:
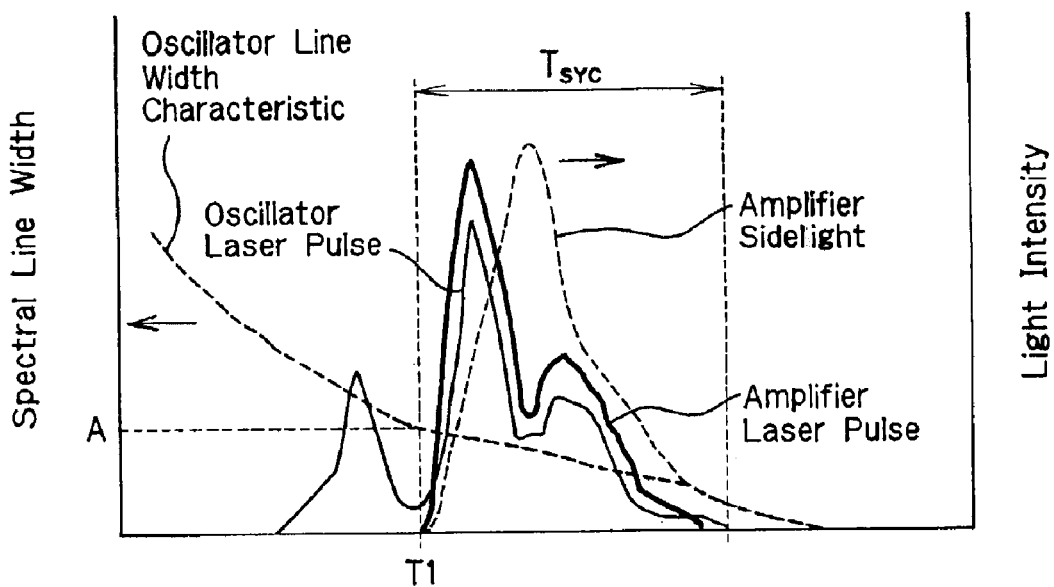
FIGS. 27(a) and 27(b) are graphs showing relationships among oscillator laser line width characteristic, oscillator laser pulse waveform, amplifier laser sidelight waveform, and amplifier laser pulse waveform, regarding the time point of sidelight rise as time origin.
Figure 27B:
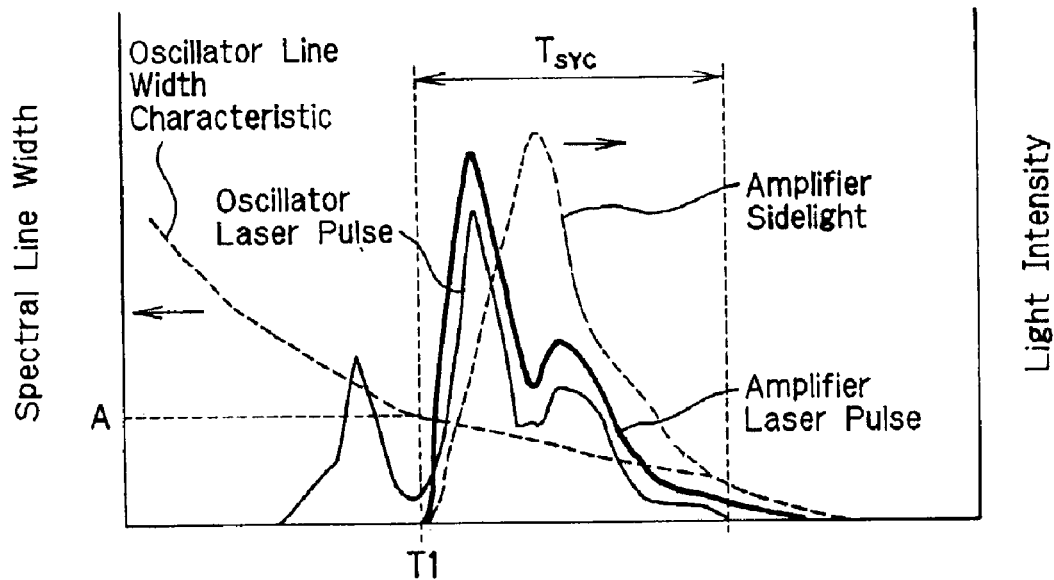

This will be explained in further detail with reference to the illustration shown in FIGS. 27(a) and 27(b). FIG. 27(a) and FIG. 27(b) are graphs showing relationships among oscillator laser line width characteristic, oscillator laser pulse waveform, amplifier laser sidelight waveform, and amplifier laser pulse waveform, regarding the time point of sidelight rise as starting point. FIG. 27(a) is for a MOPA system, and FIG. 27(b) is for an injection locking system. There is a certain difference between the two systems in that, the amplifier laser pulse ends at the vicinity of the end point of the oscillator laser pulse in case of the MOPA system, while in case of the injection locking system, the amplifier laser continues to oscillate after the end point of oscillator laser pulse. The waveforms are normalized and do not show actual relative intensities.

As described above, the time point T1 relative to the starting point of sidelight (rise of discharge), at which a predetermined spectral line width A is obtained, is determined by the line width characteristic of the oscillator laser which is in turn determined by the kind of buffer gas being used in the oscillator laser and the characteristic of the band narrowing module.

The time point of oscillator laser rise is not necessary to exist after T1 as is the case in conventional example, and the oscillator laser pulse is generated in such a manner that T1 exists within the duration time of the oscillator laser pulse.

A synchronous controller controls the discharge timing of the amplifier laser by sending a trigger signal to the power supply of the amplifier laser in such a manner that the sidelight rise occurs (discharge occurs) in the amplifier laser within a time interval from the time point T1 to the end of the oscillator laser pulse ($T_{SYC}$). As the spectral line width at a certain time point within $T_{SYC}$ is reflected to the output spectrum of the amplifier laser, the spectral line width emitted from the two stage laser system has a desired value (for example, 0.2 pm or narrower).

As described in the conventional example, the momentary laser power in the oscillator laser pulse is required in practice to have such a level that a sufficient laser amplification can be performed in the two stage laser system. Considering this, in the examples shown in FIG. 27(a) and FIG. 27(b), the starting point of $T_{SYC}$ is later than the time point T1 and the end point of $T_{SYC}$ is earlier than the end point of the oscillator laser pulse.

In the present invention, the amplifier laser is not controlled by evaluating the integrated waveform, as is the case in conventional example, but the amplifier laser is controlled based on the time point at which a desired spectral line width is obtained in the seed laser pulse from the oscillator laser. That is, the oscillator laser pulse may be generated in such a manner that above described time point T1 exists within the duration time of the oscillator laser pulse, and ASE component is allowed to exist in the oscillator laser pulse at a certain time point at or before the time point T1.

Consequently, the use of He gas as buffer gas contained in laser gas for the oscillator laser becomes possible. He gas is less subject to field concentration in comparison with Ne gas, due to difference in gas characteristics such as discharge resistance, which helps to achieve a stable discharge especially in a high repetition rate. In addition, it is easier than Ne gas to achieve a high rate gas circulation in laser chamber by means of a cross flow fan, due to its smaller mass in comparison with Ne gas. Therefore, the gas replacement between discharges effected by gas circulation can be sufficiently performed, helping to achieve a stable discharge. As a result, a high repetition rate of 4 kHz or higher becomes achievable.

In addition, in order to obtain a desired spectral purity, the purity characteristic may be used in place of the line width characteristic, the amplifier laser being controlled based on a time point corresponding to a desired spectral purity.

In the following, the present invention will be described with reference to specific embodiments.

Figure 1:
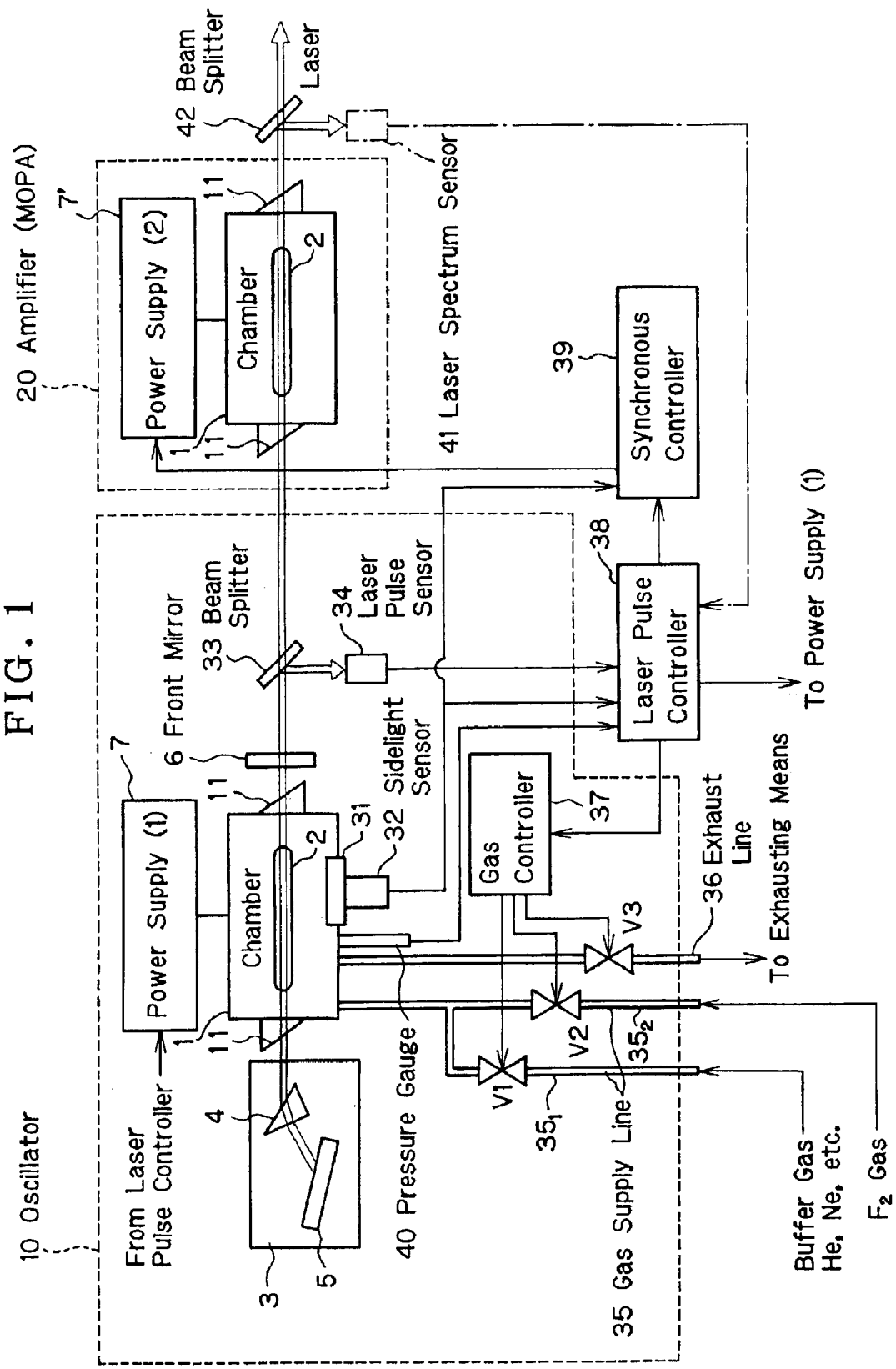
FIG. 1 is a schematic representation of a construction example of a two stage laser system of the present invention.
Figure 21:
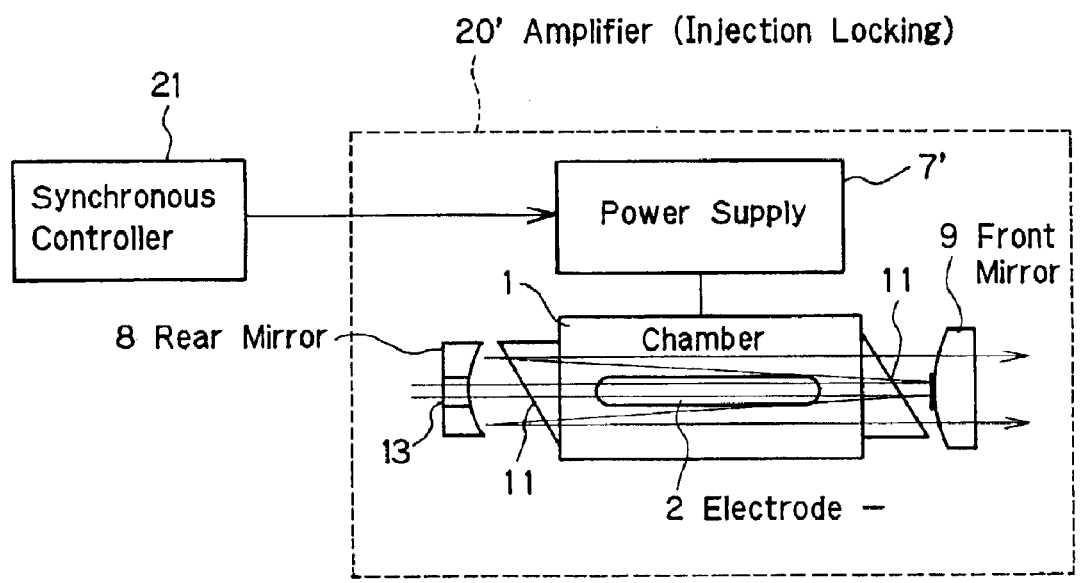
FIG. 21 is a schematic representation of a construction example of an amplifier laser in an injection locking system.
Figure 22:
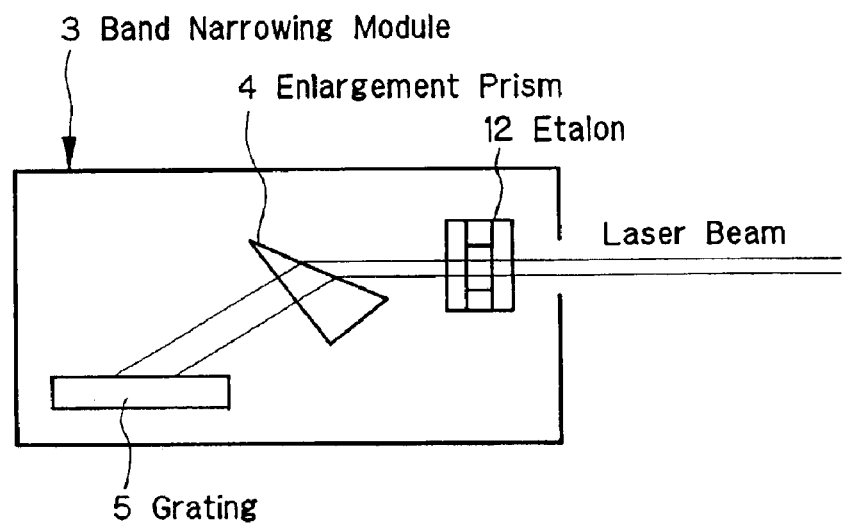
FIG. 22 is a schematic representation of a construction of a band narrowing module having a combined construction using etalon and grating 5 as wavelength selection element.
Figure 23A:
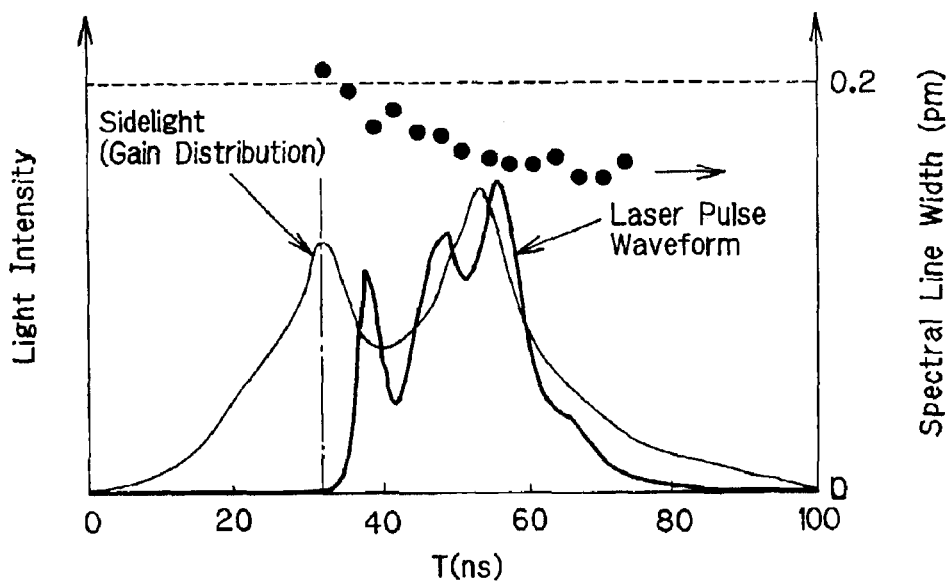
FIGS. 23(a) and 23(b) are graphs each showing a time sequence of a laser pulse waveform, a sidelight waveform, and a spectral line width in a laser pulse, representing a relationship between sidelight and subsequent laser pulse rise.
Figure 23B:
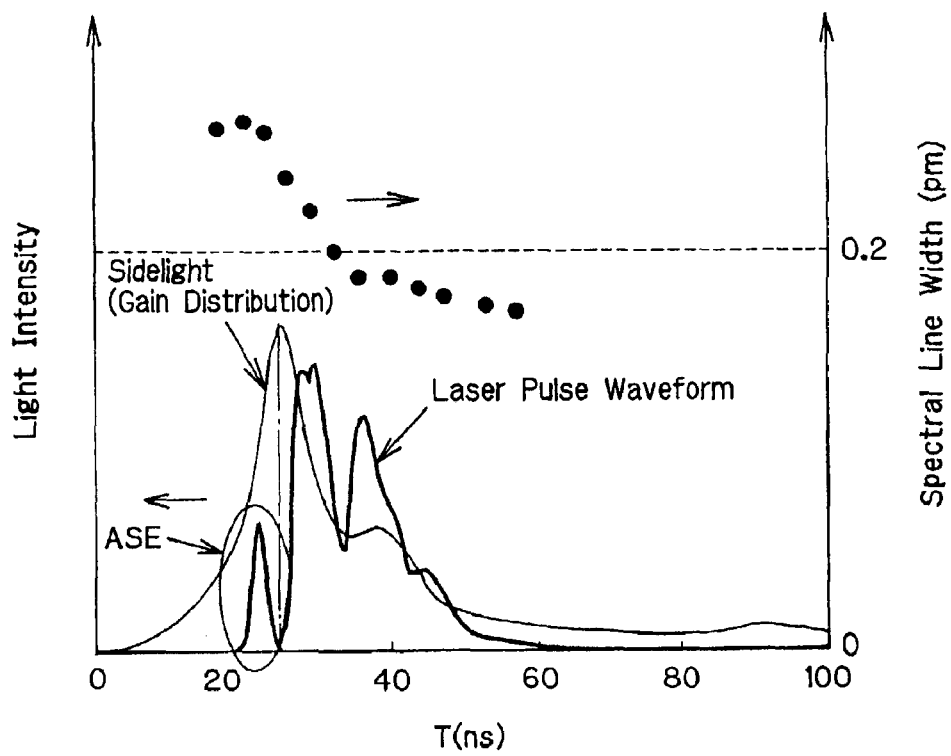
Figure 24:
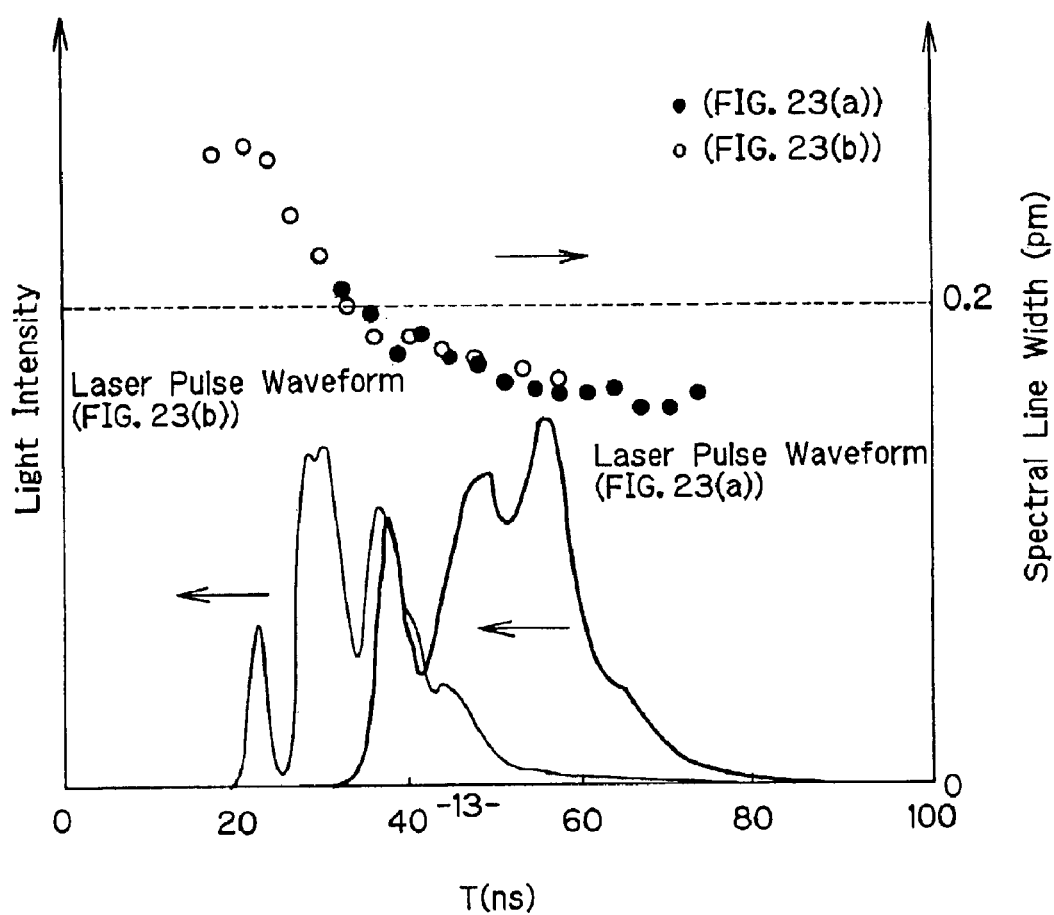
FIG. 24 is a graph combining time sequences of spectral line width and laser pulse waveforms of FIG. 23(a) and FIG. 23(b)

A construction example of a two stage laser system of the present invention is shown in FIG. 1. The example shown in FIG. 1 employs the MOPA system. The case in which the injection locking system is employed in the amplifier laser is shown for example in FIG. 21 in construction of an amplifier laser 20'.

Figure 20:
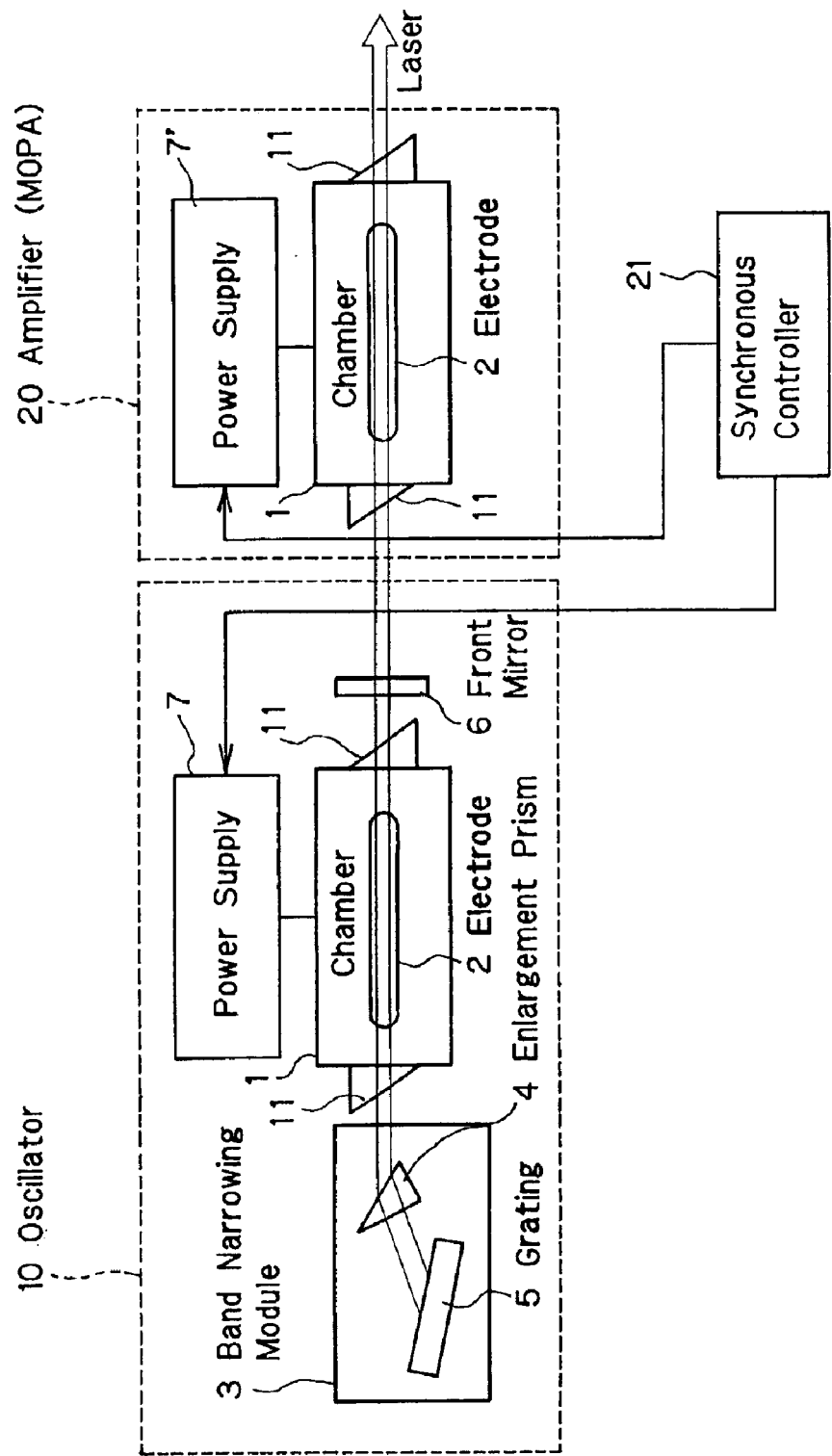
FIG. 20 is a schematic representation of a construction example of a MOPA two stage system of prior art.

The difference from a conventional example shown in FIG. 20 is as follows. In the present invention, mainly two kinds of controls are performed based on a time T1 from the sidelight starting point (discharge starting point) until a desired spectral line width A is reached according to a specific line width characteristic in an oscillator laser 10. That is, the aforementioned two kinds of controls are a control in order that a seed laser pulse emitted from the oscillator laser 10 exists at the time point T1, and a control in order that a discharge occurs in an amplifier laser 20 at and after the time point T1.

In order to detect the starting point of the sidelight, the construction example of the present invention provides a window 31 having a window member made with material transparent to laser light such as $CaF_2$ at a side surface of a chamber 1 of the oscillator laser 10. Through this window 31, the sidelight of the oscillator laser 10 is detected by a sidelight sensor 32.

Laser light is taken out of a front mirror 6 of the oscillator laser 10. A part of the light is split by a beam splitter 33 and is guided to a laser pulse sensor 34. The rest of the light is injected into the amplifier laser 20 as seed laser beam.

Connected to the laser chamber 1 of the oscillator laser 10 are a gas supply line 35 for supplying $F_2$ gas and buffer gas such as rare gas to the laser chamber 1, and an exhaust line 36 for exhausting gas from the laser chamber. The gas supply line 35 comprises a line $35_2$ for supplying $F_2$ gas and a line $35_1$ for supplying buffer gas such as rare gas. The line $35_1$ for supplying buffer gas such as rare gas is connected via a valve V1 to a buffer gas source which is not shown, and the line $35_2$ for supplying $F_2$ gas is connected via a valve V2 to a $F_2$ gas source which is not shown. $F_2$ gas is typically supplied from the $F_2$ gas source in the form of diluted $F_2$ gas in which $F_2$ gas is diluted with rare gas or other gas, because the $F_2$ gas is extremely reactive. In the downstream of the valve V1 and the valve V2, the above-described two lines $35_1$, $35_2$ are joined to be connected to the laser chamber 1. The exhaust line 36 is connected via a valve V3 to an exhausting means which is not shown. In addition, in the case of KrF laser device or ArF laser device, Kr gas supply line (not shown) or Ar gas supply line (not shown) is provided respectively, which is connected via a valve to a Kr gas source or a Ar gas source and joins in the downstream of the valve with above-described two lines, respectively.

A gas controller 37 controls the opening and closing of the valves V1, V2, V3 to perform gas supply to, and gas exhaust from the laser chamber 1. In the case of KrF laser device or ArF laser device, the controller further controls the opening and closing of the valve in the Kr gas supply line or the Ar gas supply line.

The outputs from the sidelight sensor 32 and the laser pulse sensor 34 are sent to a laser pulse controller 38. The laser pulse controller 38 stores beforehand the time T1 from the sidelight starting point (discharge starting point) until a desired spectral line width A is reached in the oscillator laser 10.

The laser pulse controller 38 sends a trigger signal to a power supply (1) 7 of the oscillator laser 10 as an ON command to apply a high voltage pulse from the power supply (1) 7 to a pair of electrodes 2 of the oscillator laser 10, thus generating a discharge.

Based on output signals generated after the discharge and sent from the sidelight sensor 32 and the laser pulse sensor 34, the laser pulse controller 38 determines whether the seed laser pulse emitted from the oscillator laser 10 exists at the time point T1 or not. If it does not exist, the laser pulse controller 38 changes such conditions in the oscillator laser 10 as $F_2$ concentration or laser gas total pressure in laser chamber, or applied voltage, to adjust so that seed laser pulse exists at the time point T1.

When controlling $F_2$ concentration or laser gas total pressure, the laser pulse controller 38 sends a controlling command to the gas controller 37 so that the gas controller 37 controls the valves V1, V2, V3 to bring $F_2$ concentration or laser gas total pressure to the value of the control signal from the laser pulse controller 38. In addition, when KrF laser device or ArF laser device is used, the controller further controls the opening and closing of the valves in the Kr gas supply line or the Ar gas supply line. When controlling applied voltage, the laser pulse controller 38 sends a signal to the power supply (1) 7 so that the power supply (1) 7 set the applied voltage at the predetermined value.

The laser pulse controller 38 further sends a discharge timing signal for the amplifier laser 20 to a synchronous controller 39 based on the signal from the sidelight sensor 32 in order that a discharge occurs in the amplifier laser 20 at and after the above described time point T1. The synchronous controller 39, on receiving the discharge timing signal, sends a trigger signal to a power supply (2) 7' of the amplifier laser 20 as an ON command to apply a high voltage pulse from the power supply (2) 7' of the amplifier laser 20 to a pair of electrodes 2 of the amplifier laser 20, thus generating a discharge.

When controlling the spectral purity, a control similar to the one described above is performed using a purity characteristic in place of the line width characteristic, and using a time point Tp where a desired spectral purity A' is reached in place of the time point T1 where a desired spectral line width A is reached.

Hereinafter, a control algorithm according to the present invention will be described. First, the outline of the algorithm will be described.

As described above, the control according to the present invention is basically as follows.

From the output of the sidelight sensor 32 and the laser pulse sensor 34, the laser pulse controller 38 detects the time in which the laser pulse exists in the oscillator laser 10, regarding the sidelight rise (starting point) as time origin.

The laser pulse controller 38 controls in such a manner that the laser pulse (seed laser pulse) from the oscillator laser 10 exists at and after the time point T1 where a desired line width is reached in the line width characteristic, regarding the sidelight rise (starting point) as time origin.

Specifically, the laser pulse controller 38 sends commands to the gas controller 37 and/or the power supply (1) 7 to control such parameters of the oscillator laser 10 as $F_2$ concentration, laser gas total pressure in the laser chamber 1, and/or applied voltage to a pair of electrodes 2, singly or in combination.

The discharge is controlled in such a manner that the discharge starts (sidelight rises) in the amplifier laser 20 at and after the above described time point T1.

Specifically, based on the discharge timing signal for the amplifier laser 20 received from the laser pulse controller 38, the synchronous controller 39 sends a trigger signal to the power supply (2) 7' to control the discharge in the amplifier laser 20.

Here, the line width characteristic which is a time-related change of the spectral line width of the light emitted by a discharge regarding the sidelight rise as time origin is stored beforehand as a database in the laser pulse controller 38 or anywhere outside, the data base being called out when necessary, as the line width characteristic is almost determined by the state of buffer gas being used in the oscillator laser 10 and the characteristic of a band narrowing module 3 being used, as described above. In the following, the outline of the control will be described with reference to FIG. 2.

Figure 2:
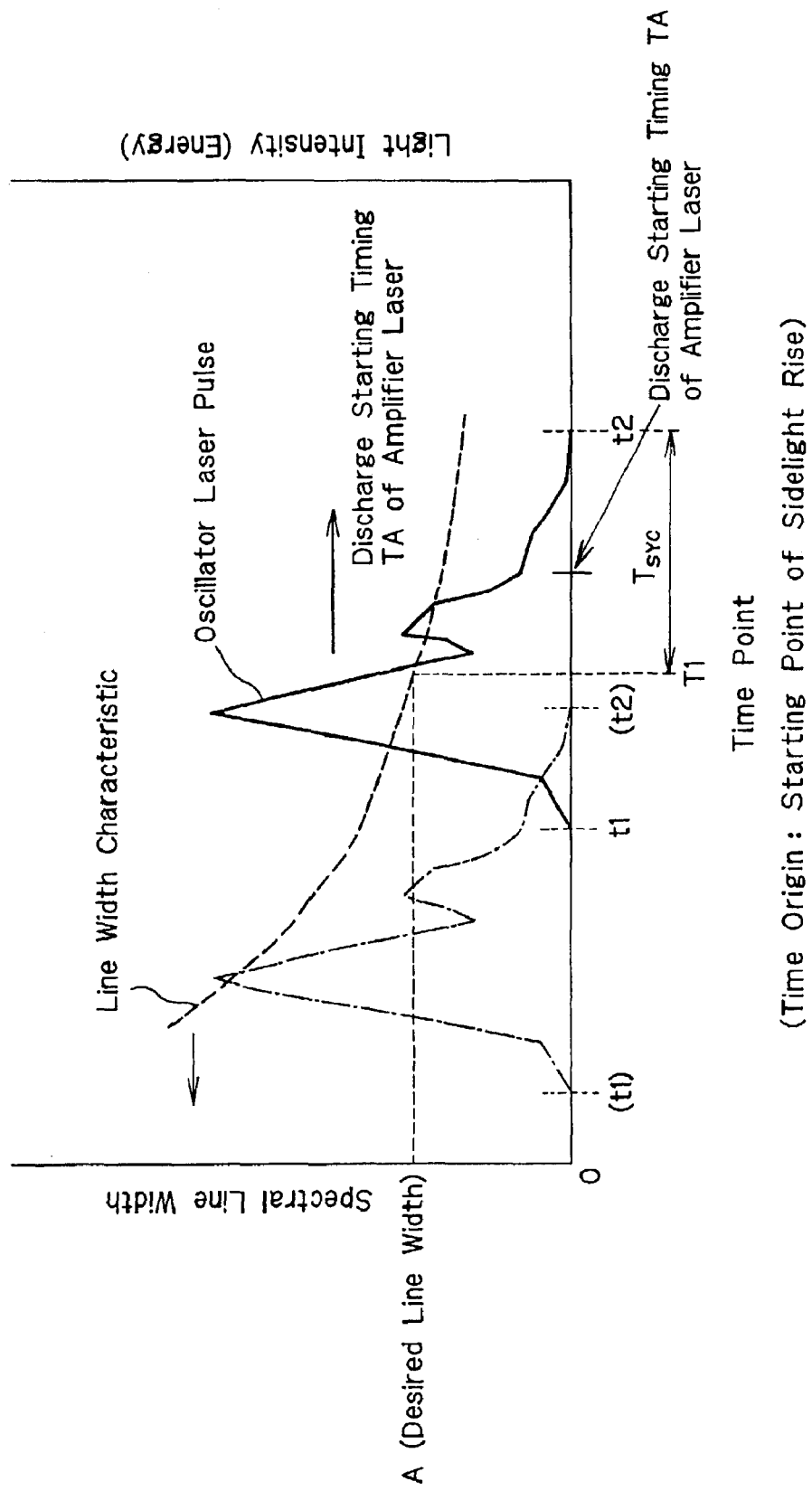
FIG. 2 is a graph for schematically illustrating control of a two stage laser system of the present invention.

In FIG. 2, the desired spectral line width A is reached in the line width characteristic at and after a time point T1. The time point T1 exists within the duration time of the laser pulse of the oscillator laser 10 which is expressed in solid line (t1<T1<t2, where t1 is laser pulse starting point, and t2 is laser pulse end point). Therefore, the time interval $T_{SYC}$ within which the discharge starts in the amplifier laser 20 (the time interval within which the discharge starting timing TA of the amplifier laser 20 exists) is set at and after the time point T1.

Thus, $$T1 \leq T_{SYC} \leq t2 \quad (1)$$

Figure 25:
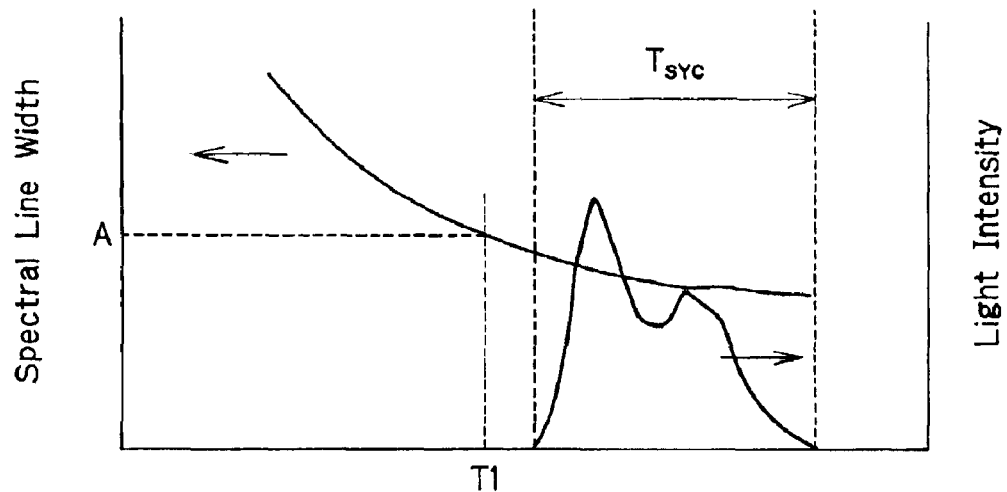
FIG. 25 is an illustration showing a relationship in an oscillator laser of prior art between a band-narrowed laser pulse and a spectral line width change of light generated after starting of discharge, regarding sidelight rise as starting point.

Here, in the case of FIG. 25, $$t1 \leq T_{SYC} \leq t2 \quad (2)$$

When the laser pulse corresponds to the curve shown by dashed line in FIG. 2, it is impossible to amplify a laser pulse having desired spectral line width, because there is no laser pulse (seed laser pulse) from the oscillator laser 10 at and after the time point T1.

In this case, the control is performed in such a manner that the starting time point of the laser pulse rise is delayed relative to the sidelight starting point, as the laser pulse waveform shown by solid line in FIG. 2, so that the time point T1 exists between the time points t1 and t2.

In experiments by the inventors of the present application, it is found that decreasing the laser gain of the oscillator laser 10 is effective for delaying the starting time point of the laser pulse rise. That is, in order to decrease the gain of the oscillator laser 10, such actions are taken as decreasing $F_2$ concentration in laser gas filled in the laser chamber 1, decreasing the total pressure of laser gas, and decreasing the voltage applied to a pair of electrodes 2 provided in the laser chamber 1 of the oscillator laser 10.

Specifically, the laser pulse controller 38 sends control commands to the gas controller 37 and/or the power supply (1) 7 to control at least one of the parameters described above.

In addition, when controlling the spectral purity, a control similar to the one described above is performed using a purity characteristic in place of the line width characteristic, and using a time point Tp where a desired spectral purity A' is reached in place of the time point T1 where a desired spectral line width A is reached.

In the following, the control algorithms will be shown. The control algorithms shown in the following are for obtaining a desired spectral line width. For obtaining a desired spectral purity, a time point Tp where a desired spectral purity A' is reached may be employed in place of the time point T1 where a desired spectral line width A is reached, as described above.

First, an algorithm of a first embodiment will be described.

Figure 3:
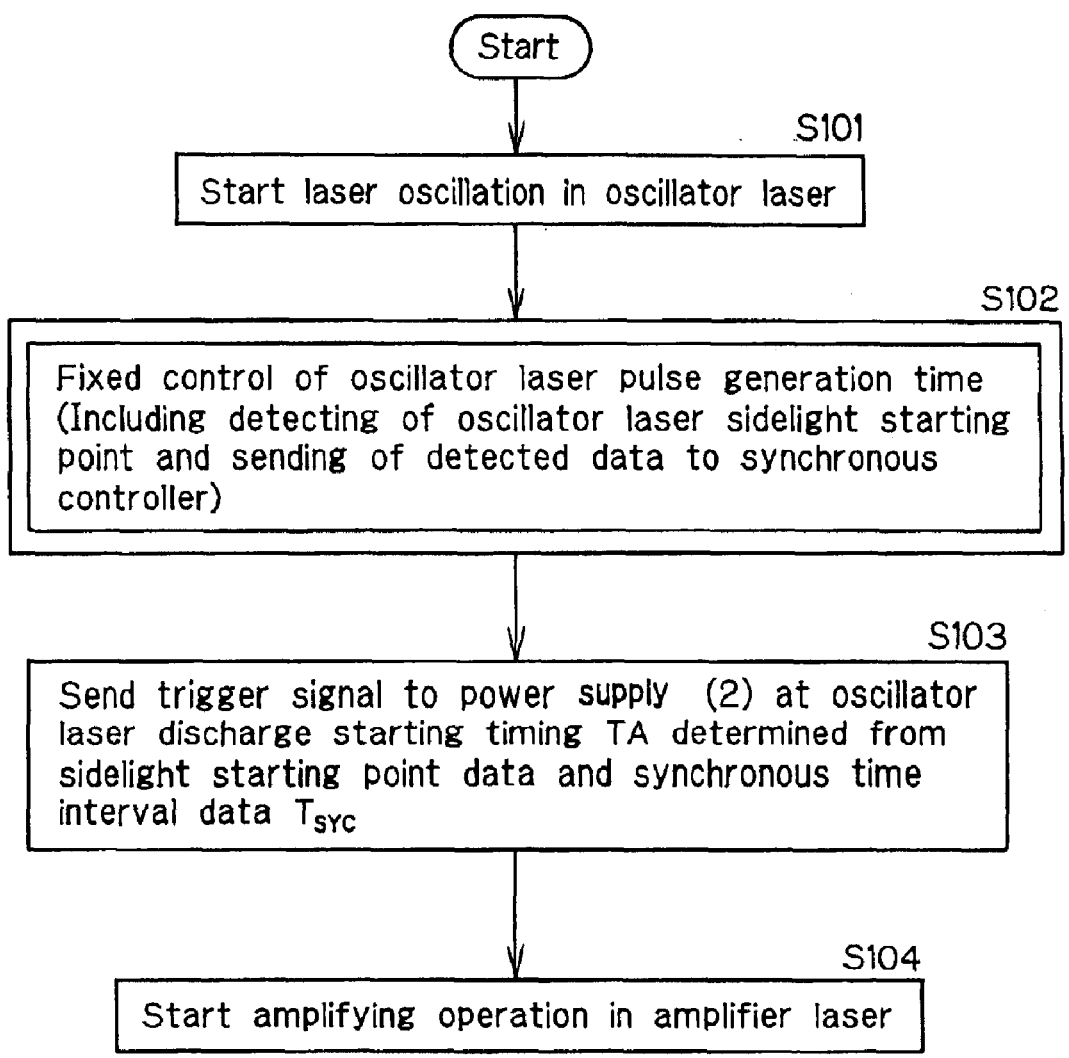
FIG. 3 is a flow chart showing overall flow in an algorithm of a first embodiment of the present invention.

In FIG. 3, a flow chart representing the overall flow is shown.

First at step S101, the laser pulse controller 38 sends a trigger signal to the power supply (1) 7 to apply a high voltage to a pair of electrodes 2 of the oscillator laser 10, thus starting the laser oscillation of the oscillator laser 10.

Then at step S102, based on the sidelight rise (starting point) data from the sidelight sensor 32, the time-related laser pulse waveform data from the laser pulse sensor 34, and the line width characteristic data stored beforehand, the laser pulse controller 38 controls in such a manner that the laser pulse (seed laser pulse) from the oscillator laser 10 exists at and after the time point T1 where the desired line width is reached in the line width characteristic in which the sidelight rise (starting point) is regarded as time origin.

Specifically, the laser pulse controller adjusts at least one of the $F_2$ concentration in laser gas filled in the laser chamber 1 of the oscillator laser 10, the laser gas total pressure, and the applied voltage to a pair of electrodes 2, in such a manner that the time points of starting point and end point (t1, t2) of the laser pulse waveform from the oscillator laser 10 regarding the sidelight rise (starting point) as time origin are at a predetermined value or in a predetermined range. Here, the time points t1 and t2 are set so that the relation between the time point T1 is;

$$T1 < t1 \quad (3)$$

or $$t1 \leq T1 \leq t2 \quad (4)$$

The step S102 will be described later in further detail.

The generation time point of the oscillator laser pulse waveform being fixed, a width of the synchronous time interval $T_{SYC}$ and its starting time point relative to the sidelight starting point as time origin is fixed to a substantially constant value from the above described T1 data derived from the line width characteristic.

Thus, a time range is fixed as follows:

$$t1 \leq T_{SYC} \leq t2 \quad (2)$$

or, $$T1 \leq T_{SYC} \leq t2 \quad (1)$$

Then at step S103, the synchronous controller 39 sends a trigger signal to the power supply (2) 7' so that the discharge of the amplifier laser 20 is started at a discharge starting timing TA of the amplifier laser 20 existing within the fixed synchronous time interval $T_{SYC}$, followed by step S104 at which a high voltage is applied from the power supply (2) 7' to a pair of electrodes 2 of the amplifier laser 20 to generate the discharge, thus the amplifying operation of the amplifier laser 20 being started.

Figure 4:
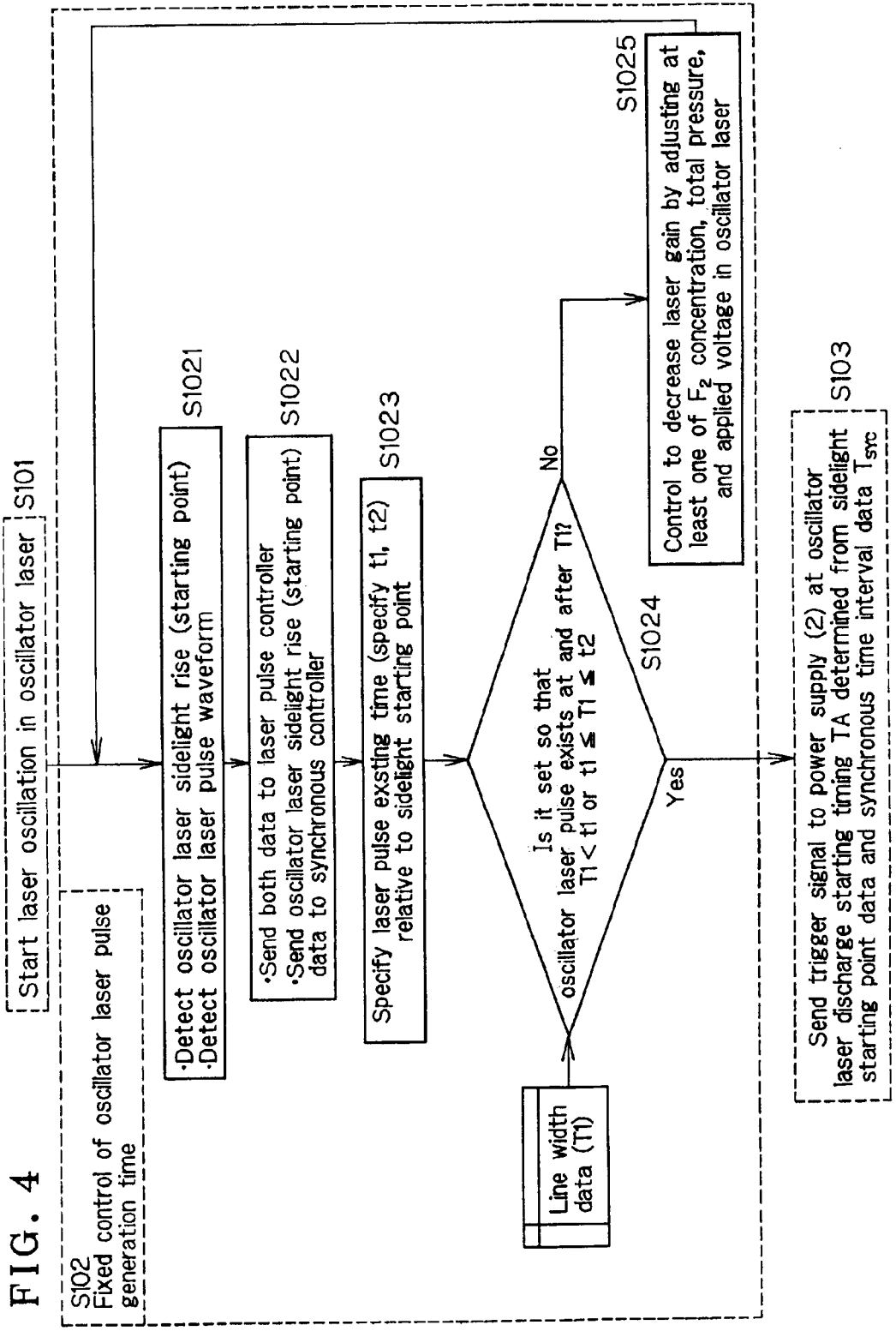
FIG. 4 is a flow chart showing a fixed control of generation time of oscillator laser pulse in the algorithm of the first embodiment of the present invention.

Next, a detailed flow chart of the above described fixed control of the pulse generation time in the oscillator laser at step S102 is shown in FIG. 4.

The fixed control of the pulse generation time in the oscillator laser comprises following steps.

First, the sidelight sensor 32 and the laser pulse sensor 34 detect the sidelight rise (starting point) and the time-related pulse waveform of the laser pulse (step S1021), and send both detected data to the pulse controller 38. The sidelight rise (starting point) data is also sent to the synchronous controller 39 (step S1022).

From the received data of sidelight rise (starting point) and the time-related pulse waveform of the laser pulse, the laser pulse controller 38 specifies the time points of starting point and end point (t1, t2) of the laser pulse waveform from the oscillator laser 10 relative to the sidelight rise (starting point) as time origin (step S1023).

The laser pulse controller 38 determines whether the laser pulse occurs at the predetermined time point relative to the sidelight starting point as time origin (step S1024), based on the data of the time points of starting point and end point (t1, t2) of the laser pulse waveform of the oscillator laser 10 specified at step S1023, and the data of the time point T1 where the desired spectral line width is reached which is called out from the line width characteristic data base stored inside the laser pulse controller 38 or outside of it.

Figure 5:
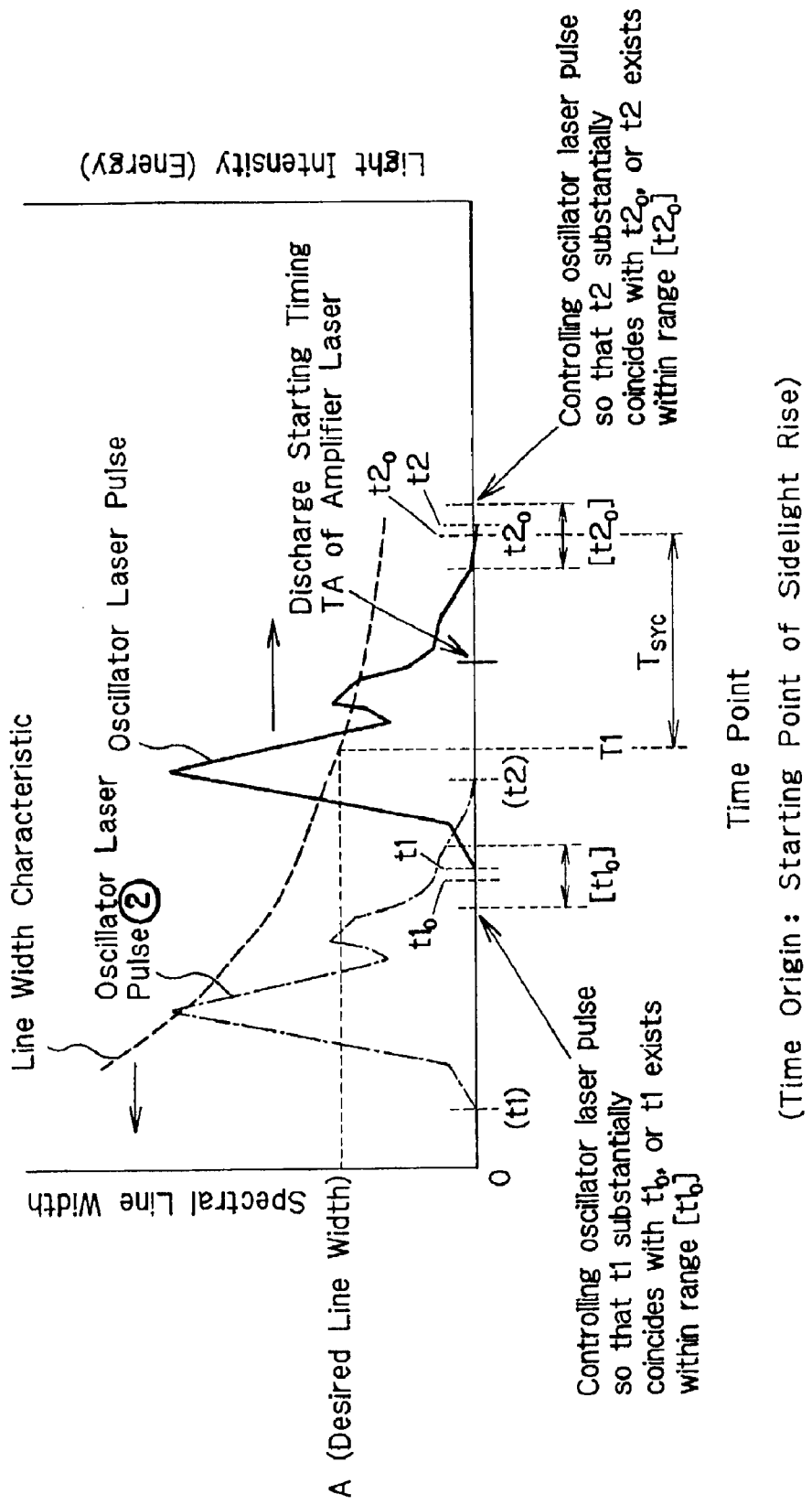
FIG. 5 is a graph for illustrating starting point and end point of a laser pulse in the algorithm of the first embodiment.

That is, it is determined whether t1 and t2 substantially coincide with $t1_0$ and $t2_0$ which satisfy the following condition. Here, $t1_0$ and $t2_0$ may be predetermined time intervals $[t1_0]$ and $[t2_0]$, as shown in FIG. 5.

$$T1 < t1_0 \quad (5)$$

or, $$t1_0 \leq T1 < t2_0 \quad (6)$$

When it is determined that t1 and t2 do not substantially coincide with previously determined $t1_0$ and $t2_0$, or that t1 and t2 do not exist in the previously determined time intervals $[t1_0]$ and $[t2_0]$ (for example, the oscillator laser pulse ② in FIG. 5), an amplified laser beam with the desired spectral line width A can not be realized by injecting oscillator laser pulse as seed laser pulse into the amplifier laser 20. Accordingly, the rise time point t1 of the oscillator laser pulse must be delayed. For this purpose, at least one of $F_2$ concentration of laser gas filled in the oscillator laser 10, total pressure of laser gas, and voltage applied to a pair of electrodes is adjusted (step S1025).

At step S1025, when the applied voltage is controlled, a decrease of the applied voltage causes a decrease of the laser gain, which in turn causes a delay of the starting point of laser pulse rise. The laser pulse controller 38 sends a command to the power supply (1) 7 to decrease the applied voltage to the electrodes 2 by a predetermined value, thus decreasing the applied voltage.

At step S1025, when the $F_2$ concentration is controlled, a decrease of the $F_2$ concentration causes a decrease of the laser gain, which in turn causes a delay of the starting point of laser pulse rise. The laser pulse controller 38 sends a command to the gas controller 37 to decrease the $F_2$ concentration. On receiving the command, the gas controller 37 opens the valve V3 to exhaust laser gas from the laser chamber 1 while monitoring a pressure data from a pressure gauge 40, and closes the valve V3 when the laser gas pressure has fallen to a predetermined value. Then, the gas controller 37 opens the valve V1 (at this time, the valve V2 is closed) to replenish buffer gas into the laser chamber 1 while monitoring the pressure data from the pressure gauge 40, and closes the valve V1 when the laser gas pressure has risen to a predetermined value. Thus, by exhausting a predetermined volume of laser gas and replenishing the same volume of buffer gas, the $F_2$ concentration in laser gas is decreased.

At step S1025, when the laser gas pressure is controlled, a decrease of total pressure causes a decrease of $F_2$ concentration, which in turn causes a decrease of the laser gain, which in turn causes a delay of the starting point of laser pulse rise. The laser pulse controller 38 sends a command to the gas controller 37 to decrease the laser gas pressure. On receiving the command, the gas controller 37 opens the valve V3 to exhaust laser gas from the laser chamber 1 while monitoring the pressure data from the pressure gauge 40, and closes the valve V3 when the laser gas pressure has fallen to a predetermined value.

After completion of step S1025, the operations of steps S1021–S1024 are repeated.

In addition, although not shown in FIG. 4, in case the control at step S1025 has become impossible due to deterioration of gas in the chamber 1, the operation of the oscillator laser 10 is stopped, and the process goes back to step S101 to resume the laser operation after gas in the laser chamber 1 is totally replaced.

In the control at step S102, the generation time of the oscillator laser pulse is fixed in such a manner that the width of the synchronous time interval $T_{SYC}$, and the starting time point relative to the sidelight starting point as time origin are substantially constant as shown in FIG. 5.

As the width and the starting time point (relative to the sidelight starting point as time origin) of the time interval $T_{SYC}$ are substantially constant, the discharge starting timing TA in the amplifier laser is also fixed beforehand to a predetermined time point. The synchronous controller 39 sends a trigger signal to the power supply (2) 7' (step S103) in such a manner that the discharge is started in the amplifier laser 20 at the discharge starting timing TA of the amplifier laser 20, which has been fixed beforehand regarding the sidelight rise (starting point) as time origin, which is known from the data from the sidelight sensor 32. The trigger signal applies high voltage pulse from the power supply (2) 7' to a pair of electrodes of the amplifier laser 20 to generate the discharge, thus starting the amplifying operation of the amplifier laser 20 (step S104).

By the way, there is a variation in timing at which the discharge starts after the trigger signal is sent from the synchronous controller 39 to the power supply (2) 7'. For instance, the power supply (2) 7' has a magnetic pulse concentration circuit in which the discharge starting timing varies when applied voltage varies. The voltage applied to a pair of electrodes 2 of the amplifier laser 20 indeed varies, because a constant energy control is typically employed which controls the applied voltage based on a result of an energy monitor which is not shown in FIG. 1. Such phenomenon is referred to as jitter. Even if the applied voltage is constant, a circuit constant varies due to heating of the power supply (2) 7' during operation, which brings a variation of the discharge starting timing. Such phenomenon is referred to as drift.

Due to such phenomenon as jitter and drift, there is a variation in timing at which the discharge actually starts after the trigger signal is input to the power supply (2) 7'. Accordingly, there may be occasionally cases in which the discharge in the amplifier laser 20 occurs outside the synchronous time interval $T_{SYC}$, even if the control is performed so that the discharge starting timing TA in the amplifier laser is set within the synchronous time interval $T_{SYC}$. The range of such variation can be obtained beforehand by experiment or other means, and the discharge starting timing TA in the amplifier laser is preferably determined considering such variation range.

For instance, the synchronous controller 39 sends a trigger signal to the power supply (2) 7' so that the discharge is generated at a time point at about ½ of $T_{SYC}$, in order to contain the variation range within the synchronous time interval $T_{SYC}$.

Figure 6:
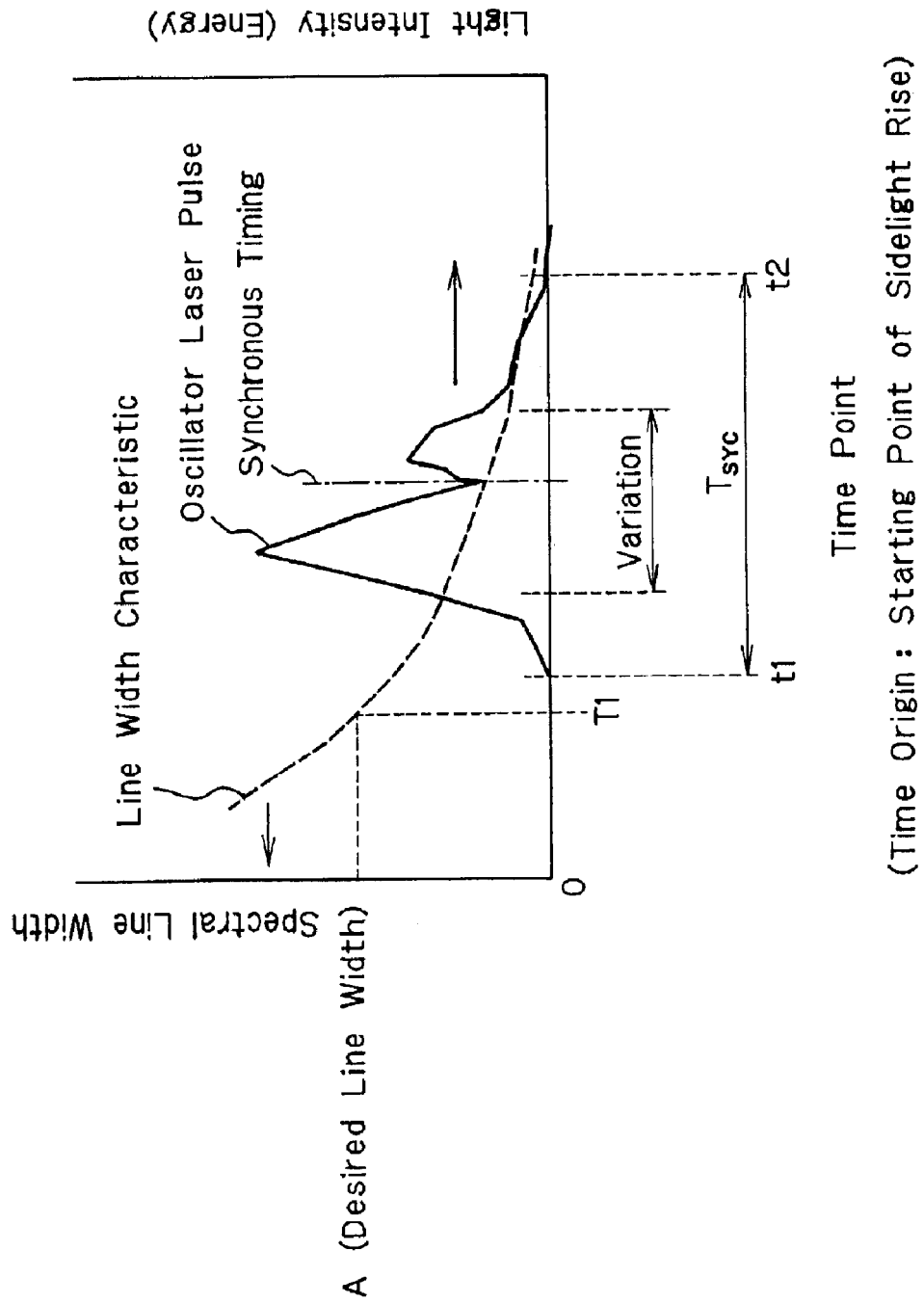
FIG. 6 is a graph showing a timing example in which a synchronous time interval coincides with laser pulse duration time.

Meanwhile, in a timing example shown in FIG. 6, the synchronous time interval $T_{SYC}$ is identical to the laser pulse duration time t1–t2. As described in the conventional example, the momentary laser energy in the oscillator laser pulse is required to have such an intensity that a sufficient laser amplification can be performed in a two stage laser system. As previously described, the momentary laser power can be too small in the vicinity of starting point or end point of a laser pulse. Considering this, the synchronous timing within the synchronous time interval $T_{SYC}$ is preferably set later than the time point t1, and the end point of $T_{SYC}$ is preferably set earlier than the time point t2.

For instance, similarly to the consideration of the variation range described above, the synchronous controller 39 sends a trigger signal to the power supply (2) 7' in such a manner that the discharge is generated at a time point at about ½ of $T_{SYC}$, and not in the vicinity of starting point or end point of a laser pulse.

Next, a variation example of the above described algorithm of the first embodiment will be described.

In the algorithm of the first embodiment described above, the synchronous time interval $T_{SYC}$ was fixed at step S102, followed by step S103 at which the operation of the amplifier laser 20 was synchronized. However, it may be difficult to repeat step S101–step S104 for every pulse, when the laser repetition rate is as high as several kHz.

In such case, the fixed control of the laser pulse generation time in the oscillator laser 10 (step S102 in FIG. 3) and the synchronous control of the amplifier laser 20 (from step S103 downward in FIG. 3) may be performed in parallel.

Figure 7:
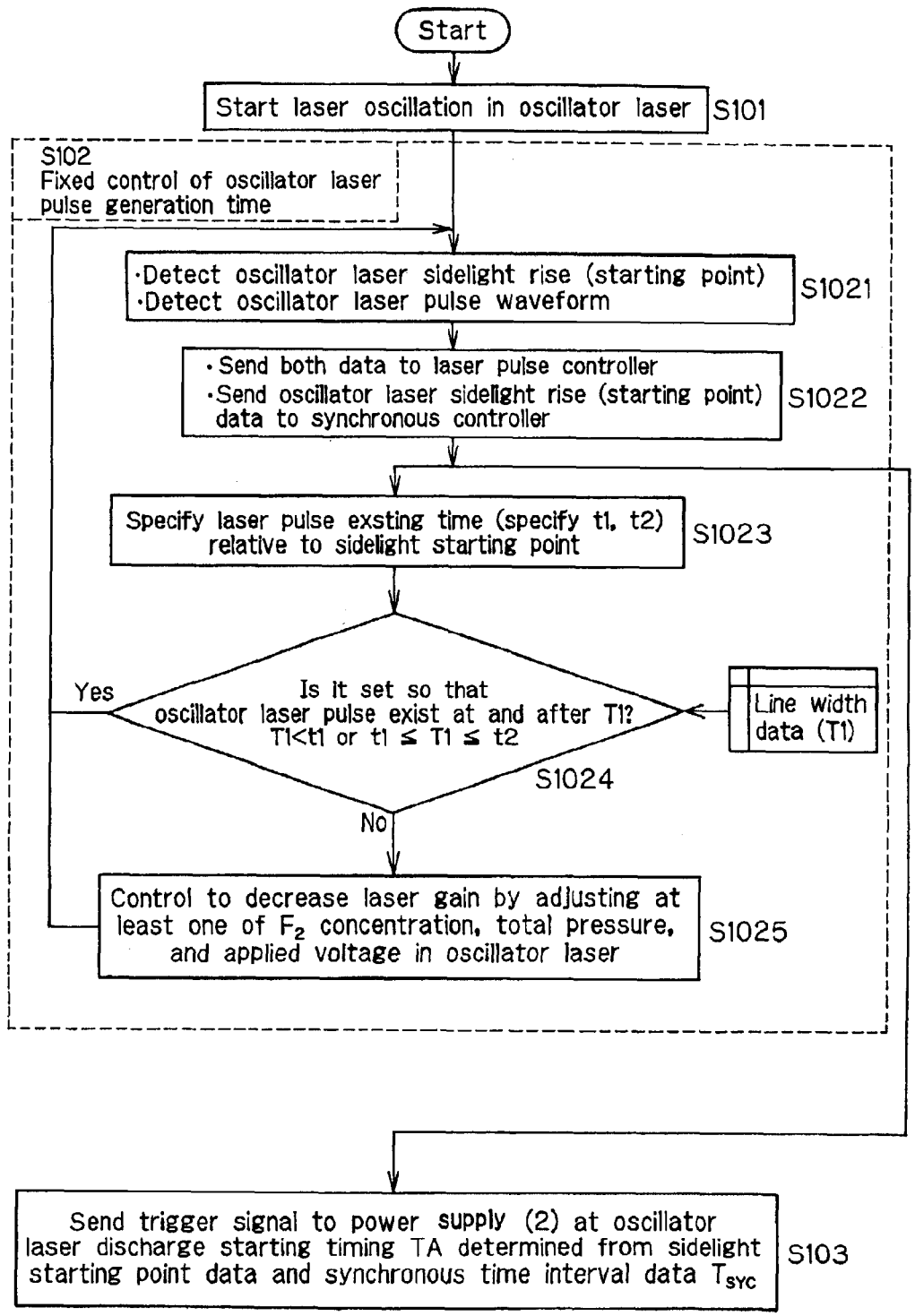
FIG. 7 is a flow chart of a variation example of the algorithm of the first embodiment.

In the following, this variation example will be described with reference to FIG. 7. After the data transmission step (step S1022) in the fixed control of the oscillator laser pulse generation time at step S102, the process proceeds to step S1023 in which the time points of starting point and end point of the laser pulse waveform (t1, t2) of the oscillator laser 10 are specified relative to the sidelight starting point as time origin, and at the same time it proceeds to step S103 at which a trigger signal is sent to the power supply (2) 7'.

As step S102 and step S103 are performed in parallel after the detection of sidelight starting point in the oscillator laser 10, step S103 being performed without going through step S102, the algorithm can cope with a high repetition rate operation.

In addition, if such parallel operation is performed immediately after the starting up of the oscillator laser 10, the laser beam can be emitted from the amplifier laser 20 under insufficient conditions for a desired line width. Therefore, it is preferable to proceed only up to step S102 at the beginning, performing the parallel operation after a predetermined time has elapsed.

Further, although not shown in the figure, in case the control at step S1025 becomes impossible due to deterioration of gas in the chamber 1, the operation of the oscillator laser 10 are stopped as well as the synchronization of the amplifier laser 20, and after total replacement of laser gas in the laser chamber 1 of the oscillator laser 10, the process goes back to step S101 to resume the operation of the oscillator laser 10 in parallel operation as described above. However, a single operation in step S102 is preferable at the beginning of operation, as described above.

Next, an algorithm of a second embodiment will be described.

Figure 8:
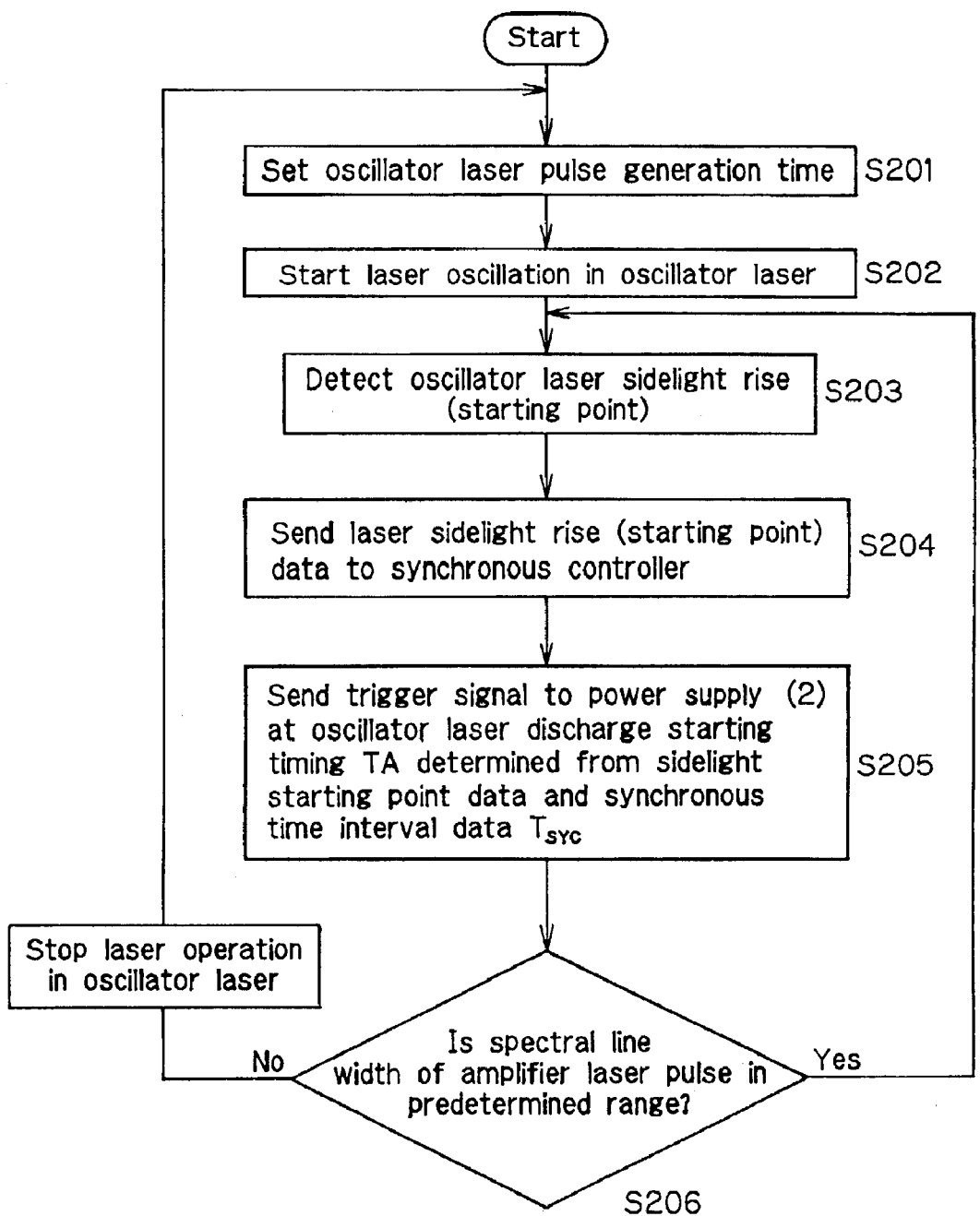
FIG. 8 is a flow chart of an algorithm of a second embodiment.

A flow chart of this embodiment is shown in FIG. 8.

In the above described algorithm of the first embodiment, the synchronous time interval $T_{SYC}$ was controlled in fixed control, followed by the synchronization of operation of the amplifier laser 20 at a predetermined timing. In the present algorithm, after setting the synchronous time interval $T_{SYC}$, the amplifier laser 20 operates without a fixed control. At the same time, a part of laser beam from the amplifier laser 20 is taken out for measuring spectral line width at a spectrum sensor 41. When the measured value is outside a predetermined range, the operations of the oscillator laser 10 and the amplifier laser 20 are stopped, and the synchronous time interval $T_{SYC}$ is set again.

In the following, the algorithm will be described with reference to FIG. 8. At step S201, the generation time of the oscillator laser pulse is set. That is, the generation time of the oscillator laser pulse is set at a predetermined time relative to the sidelight rise of the oscillator laser 10 as time origin. For this setting, the procedure of step S102 in FIG. 4 is employed, for instance. However, it is not necessary to send the laser sidelight rise (starting point) data to the synchronous controller 39 at step S1022.

After the generation time is set at step S201, the laser pulse controller sends at step S202 a trigger signal to the power supply (1) 7 to apply high voltage to a pair of electrodes 2 of the oscillator laser 10 from the power supply (1) 7, thus starting the laser oscillation of the oscillator laser 10.

Next, at step S203, the sidelight rise (starting point) is detected by the sidelight sensor 32, followed by step S204 at which the sidelight rise (starting point) data is sent to the synchronous controller 39.

By setting the generation time of the oscillator laser pulse waveform (generation starting time relative to the sidelight rise starting point as time origin) to a predetermined time, the width and the starting time point (relative to the sidelight starting point as time origin) of the synchronous time interval $T_{SYC}$ are set.

Next, at step S205, the synchronous controller 39 sends a trigger signal to the power supply (2) 7' in such a manner that the discharge is started in the amplifier laser 20 at the discharge timing TA of the amplifier laser 20 which is set to exist within the synchronous time interval $T_{SYC}$ described above. The power supply (2) 7' applies a high voltage pulse to a pair of electrodes 2 of the amplifier laser 20 to generate the discharge, thus starting the amplifying operation in the amplifier laser 20.

Here in the algorithm of the second embodiment, the fixed control is not performed after setting the synchronous time interval $T_{SYC}$ at step S201. Therefore, when a variation of operation condition (such as laser gas deterioration) of the oscillator laser occurs, the generation time of the oscillator laser pulse (generation starting time and ending time relative to the sidelight rise starting point as time origin) also varies, as well as the width and starting time point (relative to the sidelight starting point as time origin) of the synchronous time interval $T_{SYC}$. Thus, there arises a possibility that the discharge starting timing TA of the amplifier laser 20 fixed beforehand swerves from the synchronous time interval $T_{SYC}$.

Therefore, at step S206, a part of the laser beam is taken out by means of the beam splitter 42 arranged at the laser beam emission side of the amplifier laser 20 in order that the laser spectrum sensor 41 detects the spectral line width. The laser pulse controller 38 determines from the detected data whether the spectral line width is within the predetermined range. When the answer is NO, the laser operation of the oscillator laser is stopped at step S207, and the oscillator laser pulse generation time is set again at step S201.

On the other hand, when the answer is YES at step S206, the procedures of steps S203–S206 are repeated for each pulse.

In the algorithm of this example, the control system is simplified as amplifier laser 20 operates without a fixed control after setting of the synchronous interval $T_{SYC}$. Further, it can cope with a high repetition rate operation similarly to the variation example (FIG. 7) of the algorithm of the first embodiment.

In addition, in this example, the laser pulse controller 38 may transmit an abnormality signal to the outside when it is determined from the detected data that the spectral line width is outside the predetermined range.

Next, an algorithm of a third embodiment will be described.

While, in the algorithms of the above described first and second embodiments, the width and the starting time point (relative to the sidelight starting point as time origin) of the synchronous time interval $T_{SYC}$ were fixed in the control, the control algorithm may be such that it comprises setting the laser pulse from the oscillator laser 10 to exist at and after the time point T1 where the desired spectral line width A is reached in the line width characteristic, calculating every time the width and the starting time point (relative to the sidelight starting point as time origin) of the synchronous time interval $T_{SYC}$, and synchronizing the operation of the amplifier laser 20 to a predetermined timing based on the calculated synchronous time interval $T_{SYC}$, as will be described in the algorithm of the third embodiment.

Figure 9:
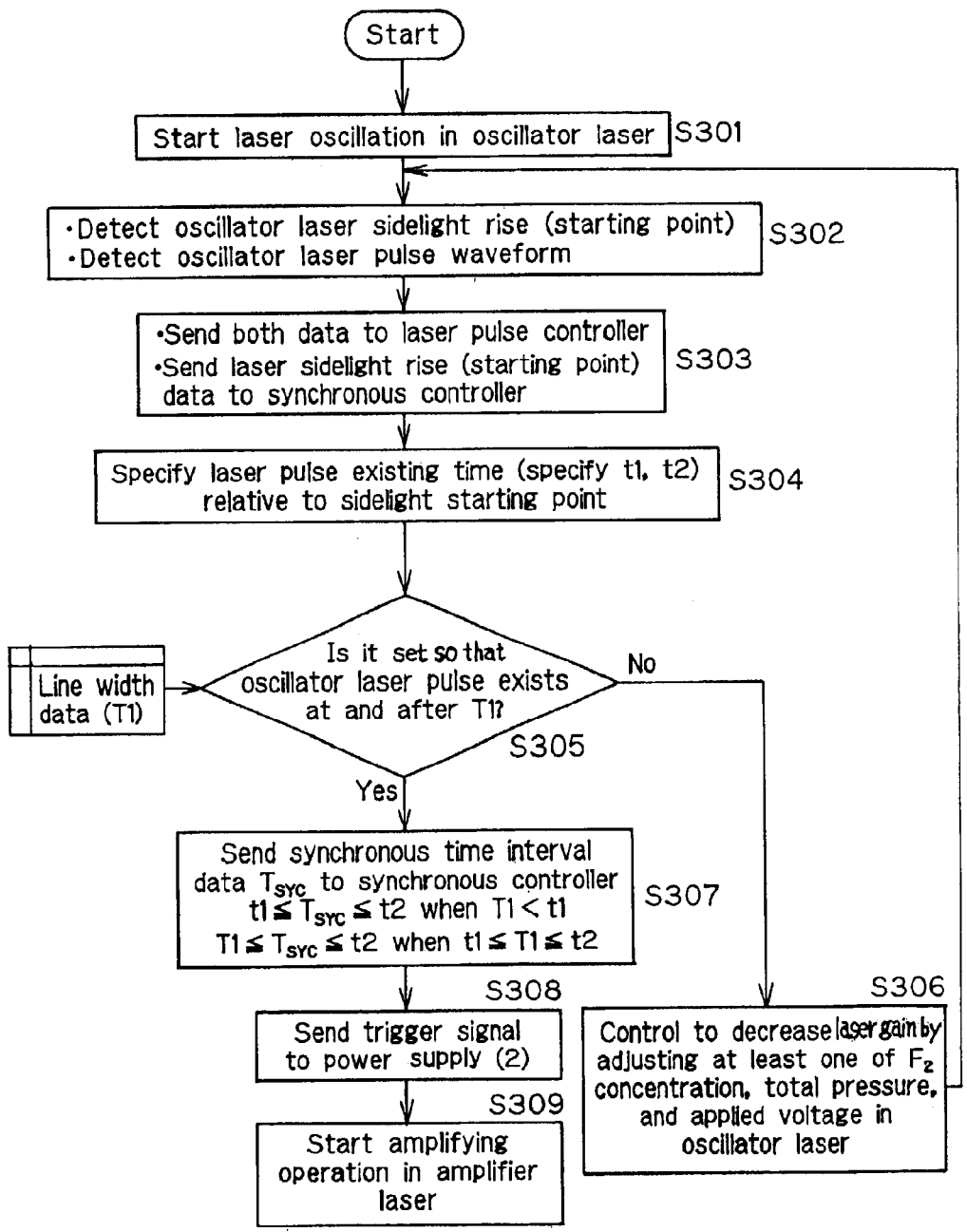
FIG. 9 is a flow chart of an algorithm of a third embodiment.

In the following, the algorithm of the third embodiment will be described with reference to FIG. 9.

At first, at step S301, the laser pulse controller 38 sends a trigger signal to the power supply (1) 7 to apply a high voltage pulse from the power supply (1) 7 to a pair of electrodes of the oscillator laser 10, thus starting the laser oscillation of the oscillator laser 10.

Then, at step S302, the sidelight sensor 32 and the laser pulse sensor 34 detect the sidelight rise (starting point) and the time-related laser pulse waveform and sends the detected data to the laser pulse controller 38 at the next step S303.

Then, at step S304, the laser pulse controller 38 specifies from the received data of the sidelight rise (starting point) and time-related pulse waveform the time points of starting point and end point (t1, t2) of the laser pulse waveform of the oscillator laser 10 relative to the sidelight starting point as time origin.

Then, at step S305, the laser pulse controller 38 determines whether the oscillator laser pulse exists at and after the time point T1 where the desired spectral line width is reached, using the data of the time points of starting point and end point (t1, t2) of the laser pulse waveform of the oscillator laser 10 specified at step S304, and the data of the time point T1 which is called out from line width characteristic data base stored in the laser pulse controller 38 or outside of it. Thus, it determines whether the following equations are satisfied or not;

$$T1 < t1 \qquad (3)$$

or, $$t1 \leq T1 \leq t2 \qquad (4)$$

If it is determined that equations (3) or (4) is not satisfied, the desired spectral line width A in the amplified laser beam can not be realized by injection of the oscillator laser pulse as seed laser pulse to the amplifier laser 20. Therefore, it is necessary to delay the rise time point t1 of the oscillator laser pulse. For this purpose, at least one of $F_2$ concentration in laser gas filled in the laser chamber 1 of the oscillator laser 10, laser gas total pressure, and the voltage applied to a pair of electrodes 2 is adjusted at step S306.

At step S306, when the applied voltage is controlled, a decrease of the applied voltage causes a decrease of the laser gain, which in turn causes a delay of the starting point of laser pulse. The laser pulse controller 38 sends a command to the power supply (1) 7 to decrease the applied voltage to the electrodes 2 by a predetermined value.

At step S306, when the $F_2$ concentration is controlled, a decrease of the $F_2$ concentration causes a decrease of the laser gain, which in turn causes a delay of the starting point of laser pulse rise. The laser pulse controller 38 sends a command to the gas controller 37 to decrease the $F_2$ concentration. On receiving the command, the gas controller 37 opens the valve V3 to exhaust laser gas from the laser chamber 1 while monitoring the pressure data from the pressure gauge 40, and closes the valve V3 when the laser gas pressure has fallen to a predetermined value. Then, the gas controller 37 opens the valve V1 (at this time, the valve V2 is closed) to replenish buffer gas into the laser chamber 1 while monitoring the pressure data from the pressure gauge 40, and closes the valve V1 when the laser gas pressure has risen to a predetermined value. Thus, by exhausting a predetermined volume of laser gas and replenishing the same volume of buffer gas, the $F_2$ concentration in laser gas is decreased.

At step S306, when the laser gas pressure is controlled, a decrease of total pressure causes a decrease of $F_2$ concentration, which in turn causes a decrease of the laser gain, which in turn causes a delay of the starting point of laser pulse rise. The laser pulse controller 38 sends a command to the gas controller 37 to decrease the gas pressure. On receiving the command, the gas controller 37 opens the valve V3 to exhaust laser gas from the laser chamber 1 while monitoring the pressure data from the pressure gauge 40, and closes the valve V3 when the laser gas pressure has fallen to a predetermined value.

After completion of step S306, the operations of steps S302–S305 are repeated.

If it is determined at step S306 that the oscillator laser pulse exists at and after the time point T1, that is, that the equation (3) or (4) is satisfied, the laser pulse controller 38 calculates at step S307 the synchronous time $T_{SYC}$, at which the amplifier laser 20 is synchronized to oscillate and sends the calculated data to the synchronous controller 39.

Thus, a time interval which satisfies:

$$t1 \leq T_{SYC} \leq t2 \qquad (2)$$

or, $$T1 \leq T_{SYC} \leq t2 \qquad (1)$$

is calculated.

Then, at step S308, the synchronous controller 39 sends a trigger signal to the power supply (2) 7' so that the discharge is started in the amplifier laser 20 within the synchronous time interval $T_{SYC}$, followed by step S309 at which a high voltage pulse is applied from the power supply (2) 7' to a pair of electrodes 2 of the amplifier laser 20, thus starting the amplifying operation in the amplifier laser 20.

As in this algorithm of the third embodiment, the width and the starting time point (relative to the sidelight starting point as time origin) of the synchronous time interval $T_{SYC}$ are calculated every time, it can cope with the variation in the laser pulse width of the oscillator laser pulse. However, the present algorithm may be difficult to perform in a high repetition rate condition, as the operation of the amplifier laser 20 is synchronized after the calculation described above.

Next, an algorithm of a fourth embodiment will be described.

The momentary energy in the oscillator laser pulse (the momentary energy at the synchronization with the amplifier laser 20) is required to have such an intensity that a sufficient amplification can be performed in the two stage laser system. In the algorithm of the fourth embodiment, the pulse energy of the oscillator laser 10 is measured and is controlled so that it surpasses a predetermined value B. The amplifier laser 20 has a table showing relationships between synchronization time and such parameters of the oscillator laser 10 as the pulse energy, the charged voltage, the gas conditions, and number of shots, and the synchronization control is made based on this table.

Figure 10:
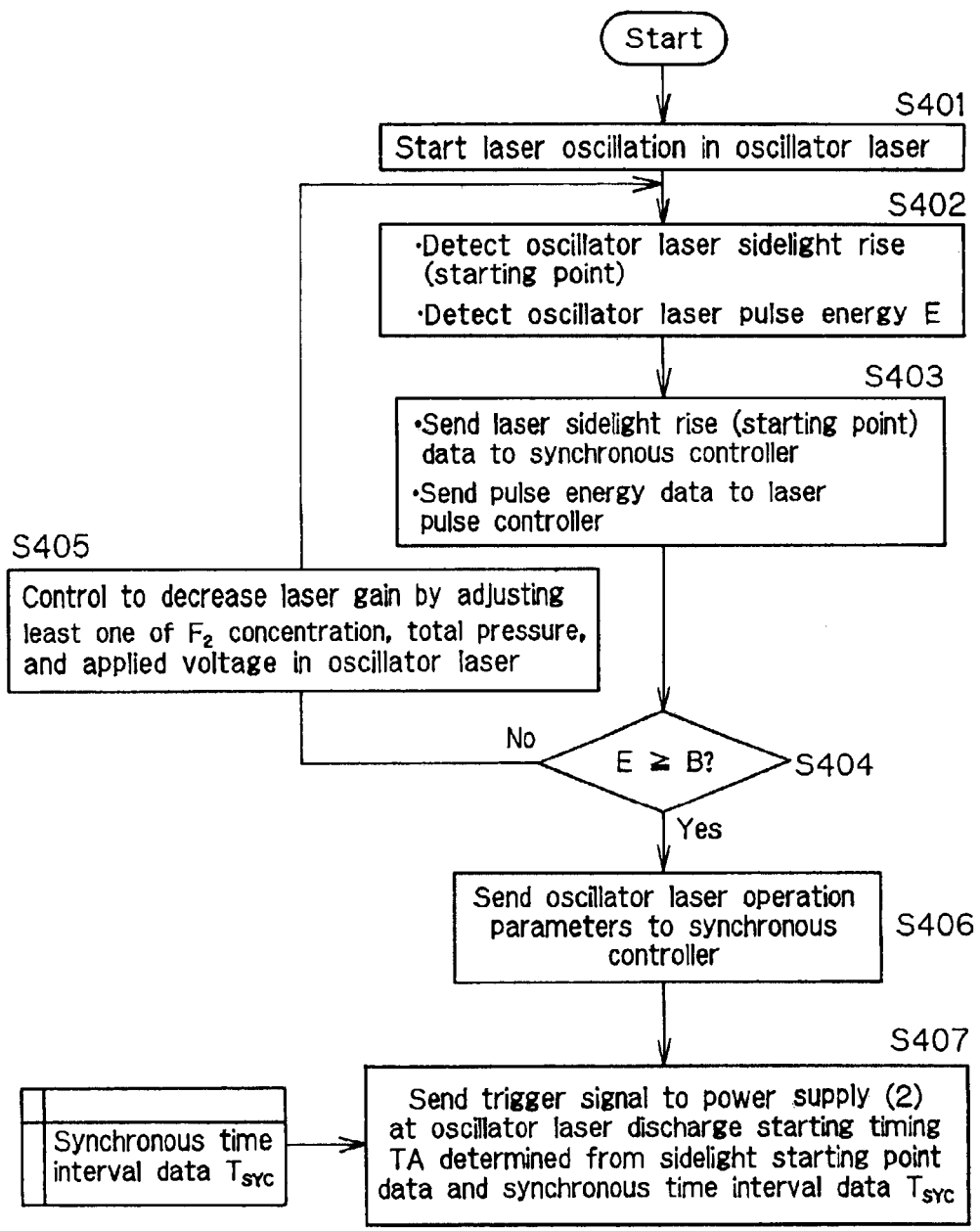
FIG. 10 is a flow chart of an algorithm of a fourth embodiment.

In the following, the algorithm will be described with reference to the flow chart of FIG. 10.

At first, at step S401, the laser pulse controller 38 sends a trigger signal to the power supply (1) 7 to apply a high voltage pulse from the power supply (1) 7 to a pair of electrodes 2 of the oscillator laser 10, thus starting the laser oscillation of the oscillator laser 10.

Then, at step S402, the sidelight sensor 32 detects the sidelight rise (starting point) of the oscillator laser 10 and at the same time, the laser pulse sensor 34 detects the laser pulse energy E of the oscillator laser 10, followed by step S403 in which the sidelight rise (starting point) data is sent to the synchronous controller 39 and at the same time, the laser pulse energy E data is sent to the laser pulse controller 38. In addition, the laser pulse sensor 34 in the algorithm of the fourth embodiment has a function of measuring the laser pulse energy.

Then, at step S404, the laser pulse controller 38 compares the received laser pulse energy E data (the measured value is represented by E) with a previously stored energy value B at which a sufficient laser amplification can be performed in a two stage laser system.

When at step S404 it is determined that E<B applies, at least one of $F_2$ gas concentration in the laser gas filled in the laser chamber of the oscillator laser 10, laser gas total pressure, and voltage applied to a pair of electrodes 2 is adjusted at step S405 in such a manner that E≧B is achieved, before going back to step S402.

When it is determined at step S404 that E≧B applies, the laser pulse controller 38 sends at step S406 such operation parameter data of the oscillator laser 10 as charged voltage of the power supply (1) 7, gas pressure in the chamber 1, and number of pulse, to the synchronous controller 39.

The synchronous controller 39 has a table of synchronous time interval $T_{SYC}$ which corresponds to the operation parameter data of the oscillator laser 10. At the next step S407, the synchronous controller calls out a synchronous time interval $T_{SYC}$ data corresponding to the received operation parameter data of the oscillator laser 10, and also using the sidelight rise (starting point) data, calculates the starting time point of the synchronous time interval $T_{SYC}$ relative to the sidelight starting point as time origin, sends a trigger signal to the power supply (2) 7' in such a manner that the discharge is started in the amplifier laser 20 at a discharge starting timing TA of the amplifier laser 20 which is set to exist within the synchronous time interval $T_{SYC}$ described above, and applies a high voltage from the power supply (2) 7' to a pair of electrodes 2 of the amplifier laser 20 to generate discharge, thereby starting the amplifying operation of the amplifier laser 20.

The present algorithm premises that, when the laser pulse energy surpasses the predetermined value B, the momentary energy in the amplifier laser pulse at the discharge starting timing TA of the amplifier laser 20 is always equal to or larger than the minimum energy required for the synchronization.

Since this algorithm of the fourth embodiment performs the operation of the amplifier laser 20 using the synchronous time interval $T_{SYC}$ data corresponding to the operation parameters of the oscillator laser 10, the control system is simplified. Also, it can cope with a high repetition rate operation as it does not calculate the synchronous time interval $T_{SYC}$ similarly to the variation example of the algorithm of the first embodiment.

Next, the algorithm of a fifth embodiment will be described.

In the algorithm of the fourth embodiment described above, it was premised that, when the laser pulse energy surpasses the predetermined value B, the momentary energy in the amplifier laser pulse at the discharge starting timing TA of the amplifier laser 20 is always equal to or larger than the minimum energy required for the synchronization. In the algorithm of the fifth embodiment, when the minimum energy required for the synchronization is denoted by $E_{min}$, and the laser pulse time in which the laser pulse energy surpasses $E_{min}$ at and after the time point T1 is signified by T', two lasers are synchronized within this time T' to realize a synchronization of two lasers at the desired line width or narrower. It will be described in detail in the following with reference to the drawings.

Figure 11:
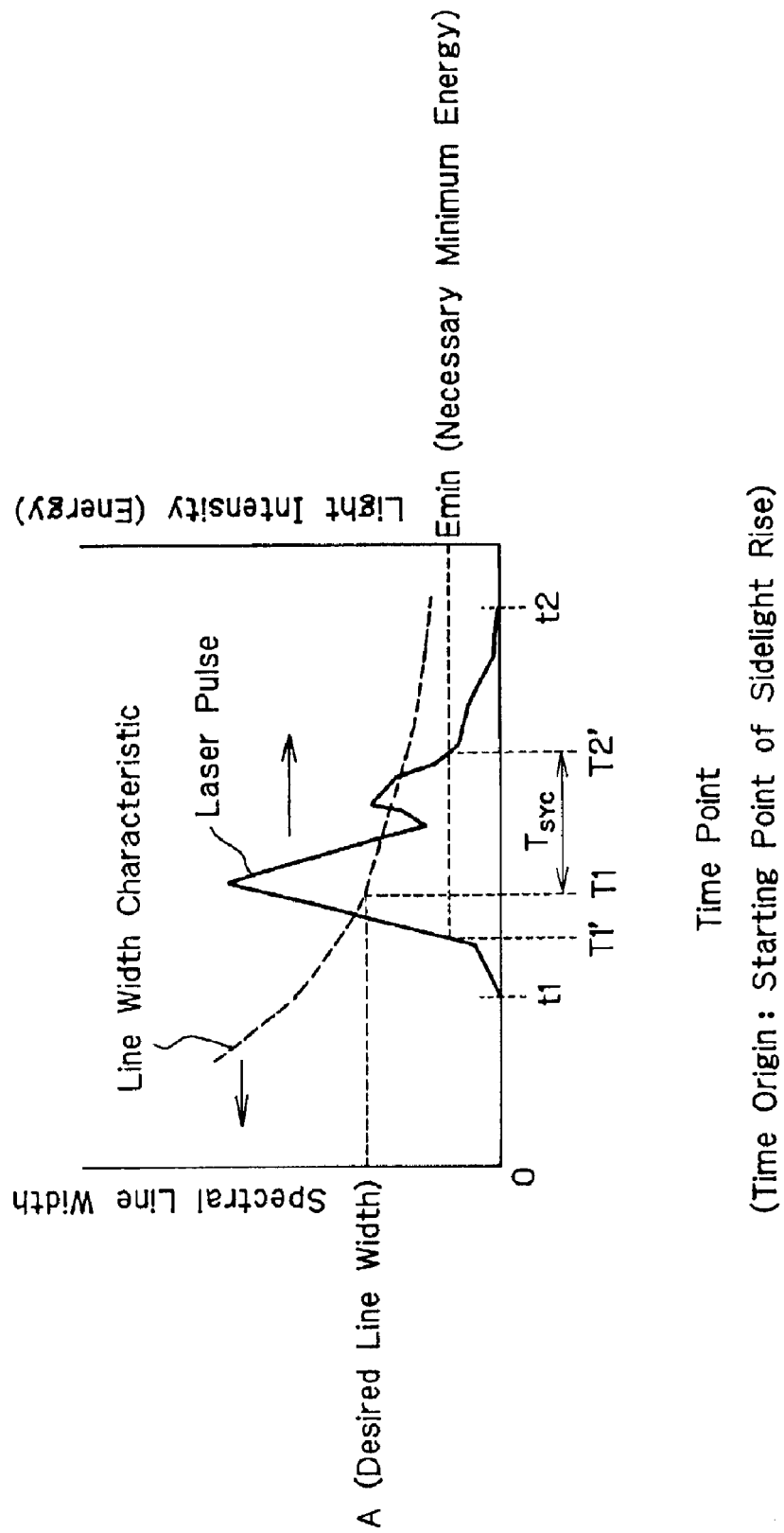
FIG. 11 is a graph showing an example of laser pulse in which a line width characteristic falls below a desired spectral line width A at and after a time point T1.

In FIG. 11, the line width characteristic falls below a desired line width A at and after a time point T1. The time point T1 exists within the duration time of the laser pulse of the oscillator laser 10 (t1<T1<t2, where t1 is starting point of the laser pulse and t2 is end point of the laser pulse). Therefore, the time interval $T_{SYC}$ within which the discharge of the amplifier laser 20 starts is set as in the previously described equation (1). Thus, $$T1 \leq T_{SYC} \leq t2 \quad (1)$$

On the other hand, considering the momentary energy in the seed laser pulse, the time interval $T_{SYC}$ within which the discharge of the amplifier laser 20 starts is set within a time interval T1'–T2'.

$$T1' \leq T_{SYC} \leq T2' \quad (7)$$

In the case of FIG. 11, T1'<T1 applies. Therefore, the time interval $T_{SYC}$ within which the discharge of the amplifier laser 20 starts is set within a time interval T1–T2'.

$$T1 \leq T_{SYC} \leq T2' \quad (8)$$

Figure 12:
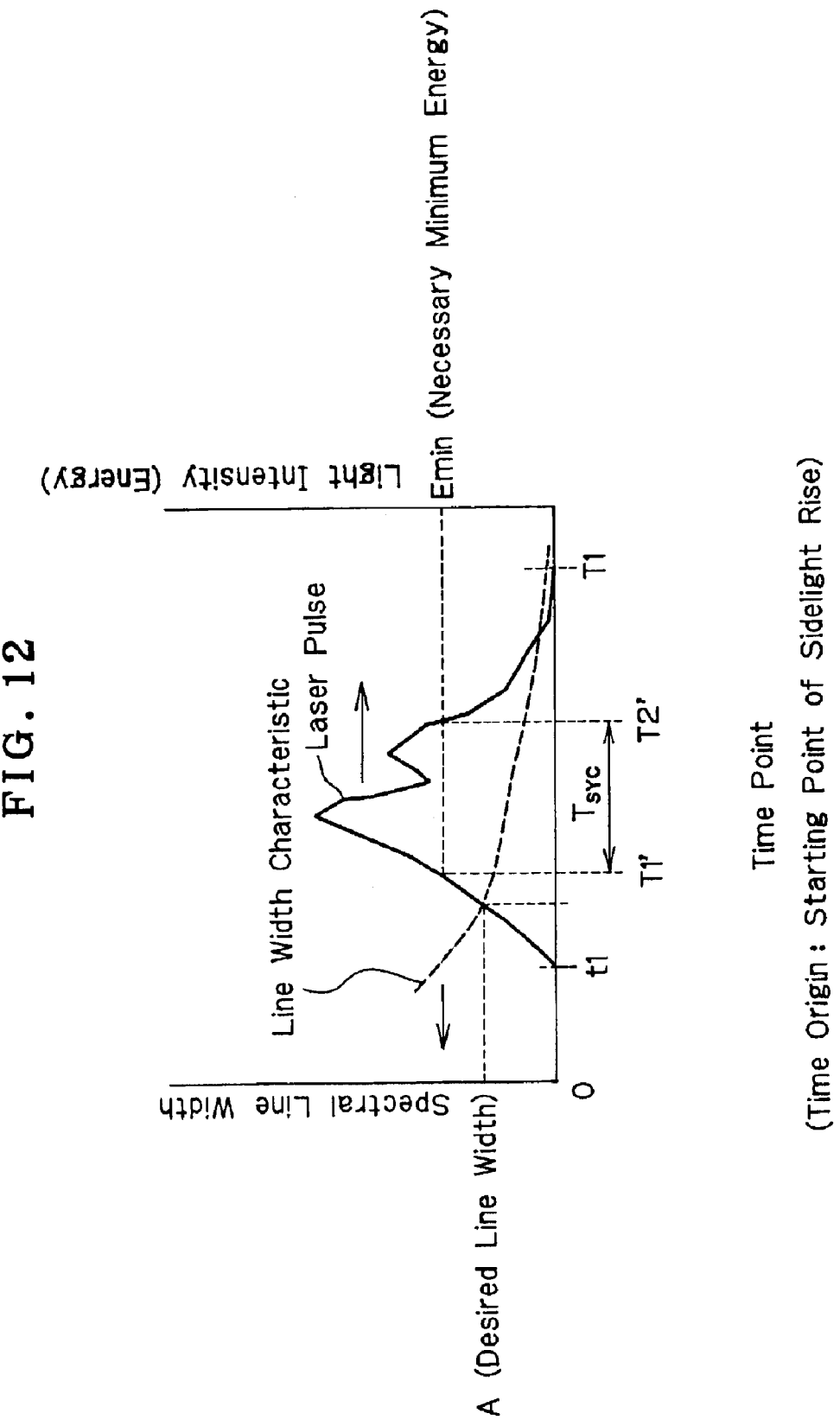
FIG. 12 is a graph showing an example of laser pulse in which a time point T1' corresponding to a minimum required energy $E_{min}$ for synchronization comes later than a time point T1.

In the case of FIG. 12, T1<T1' applies. Therefore, the time interval $T_{SYC}$ within which the discharge of the amplifier laser 20 starts is set within a time interval T1'–T2'.

$$T1' \leq T_{SYC} \leq T2' \quad (9)$$

Figure 13:
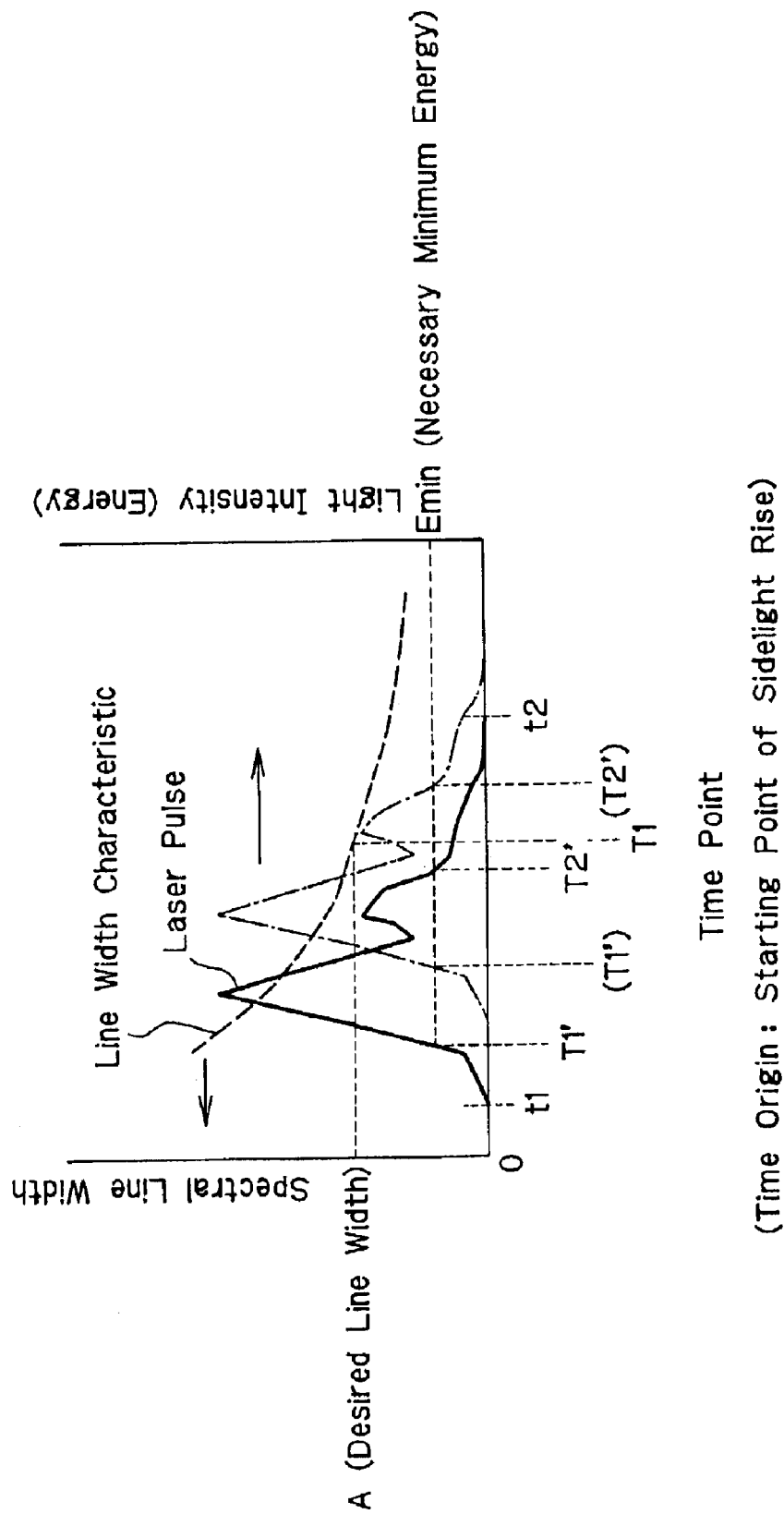
FIG. 13 is a graph showing an example of laser pulse in which the momentary energy of a laser pulse existing at and after a time point T1 falls below the necessary minimum energy $E_{min}$.

When the laser pulse is as the curve shown by solid line in FIG. 13, although the laser pulse (seed laser pulse) from the oscillator laser 10 exists at and after the time point T1, the momentary energy in the seed laser pulse within this time interval is below the minimum required energy $E_{min}$. In such state, the synchronization is impossible. In this case, the control is performed as shown in FIG. 13 in such a manner that the laser pulse rise starting time is delayed relative to the side light rise starting point, in order that the time point T1 exists earlier than the time point T2' (the curve shown by dashed line in FIG. 13).

In experiments by the inventors of the present application, it is found that decreasing the laser gain of the oscillator laser 10 is effective in delaying the starting time point of the laser pulse rise. Thus, in order to decrease the gain of the oscillator laser 10, such actions are taken as decreasing the $F_2$ concentration in laser gas filled in the laser chamber 1, decreasing the total pressure of laser gas, and decreasing the voltage applied to a pair of electrodes 2 provided in the laser chamber 1 of the oscillator laser 10. Specifically, the laser pulse controller 38 sends a control signal to the gas controller 37 and/or power supply (1) 7 to control at least one of the above described parameters.

In addition, while the laser pulse rise starting time was delayed in FIG. 13so that the time point T1 exists between the time points T1' and T2', it may be delayed so that the time point T1 exists earlier than the time point T1', as shown in FIG. 12.

Figure 14:
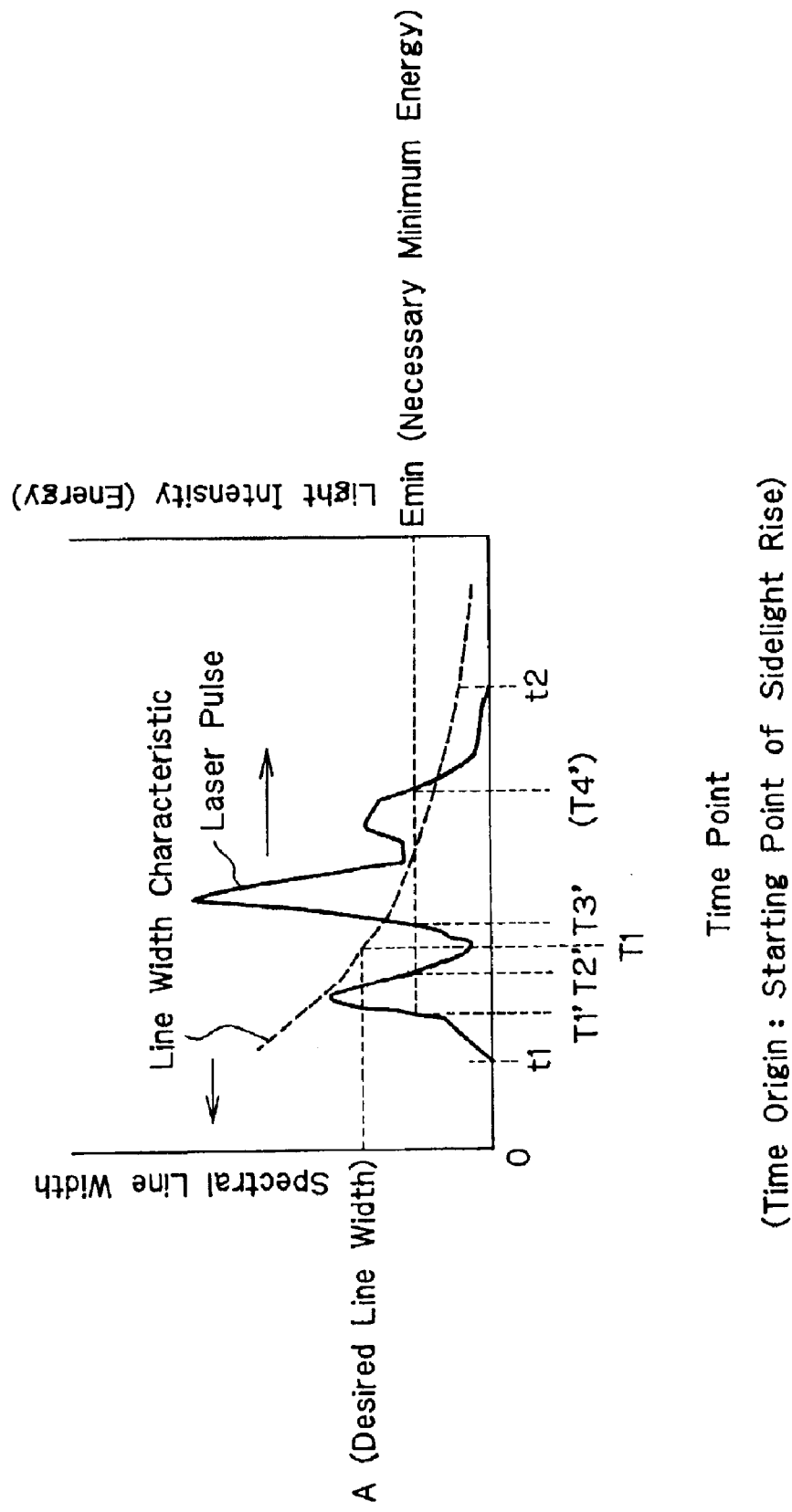
FIG. 14 is a graph showing an example of laser pulse which has a plurality of time regions in which the momentary energy of laser pulse surpasses the necessary minimum energy $E_{min}$.

Depending on the laser oscillation condition, there may be assumed a case in which a plurality of regions exist, in which the momentary energy surpasses the minimum required energy $E_{min}$. FIG. 14 shows a case having two of such regions. In this case, the relations between the time point T1 and the above described plurality of regions are examined.

When T1<T1';

$$T1' \leq T_{SYC} \leq T2' \text{ or } T3' \leq T_{SYC} \leq T4' \quad (9)$$

When T1'<T1<T2';

$$T1 \leq T_{SYC} \leq T2' \text{ or } T3' \leq T_{SYC} \leq T4' \quad (10)$$

When T2'<T1<T3';

$$T3' \leq T_{SYC} \leq T4' \quad (11)$$

When T3'≦T1≦T4';

$$T1 \leq T_{SYC} \leq T4' \quad (12)$$

When T4'<T1 applies, the synchronization is impossible. In this case, the starting time of the laser pulse rise relative to the sidelight starting point is delayed in the control so that the time point T1 satisfies any one condition of equations (9), (10), (11), and (12).

In the case of equations (9) and (10), there are a plurality of ranges where $T_{SYC}$ can exist. In this case, an arbitrary one range may be selected. As to the selection criteria, for instance, the latest existing range relative to the sidelight starting point of the oscillator laser 10 in the above described plurality of ranges may be selected. Alternatively, the range having the widest width in the above described plurality of ranges may be selected.

Figure 15:
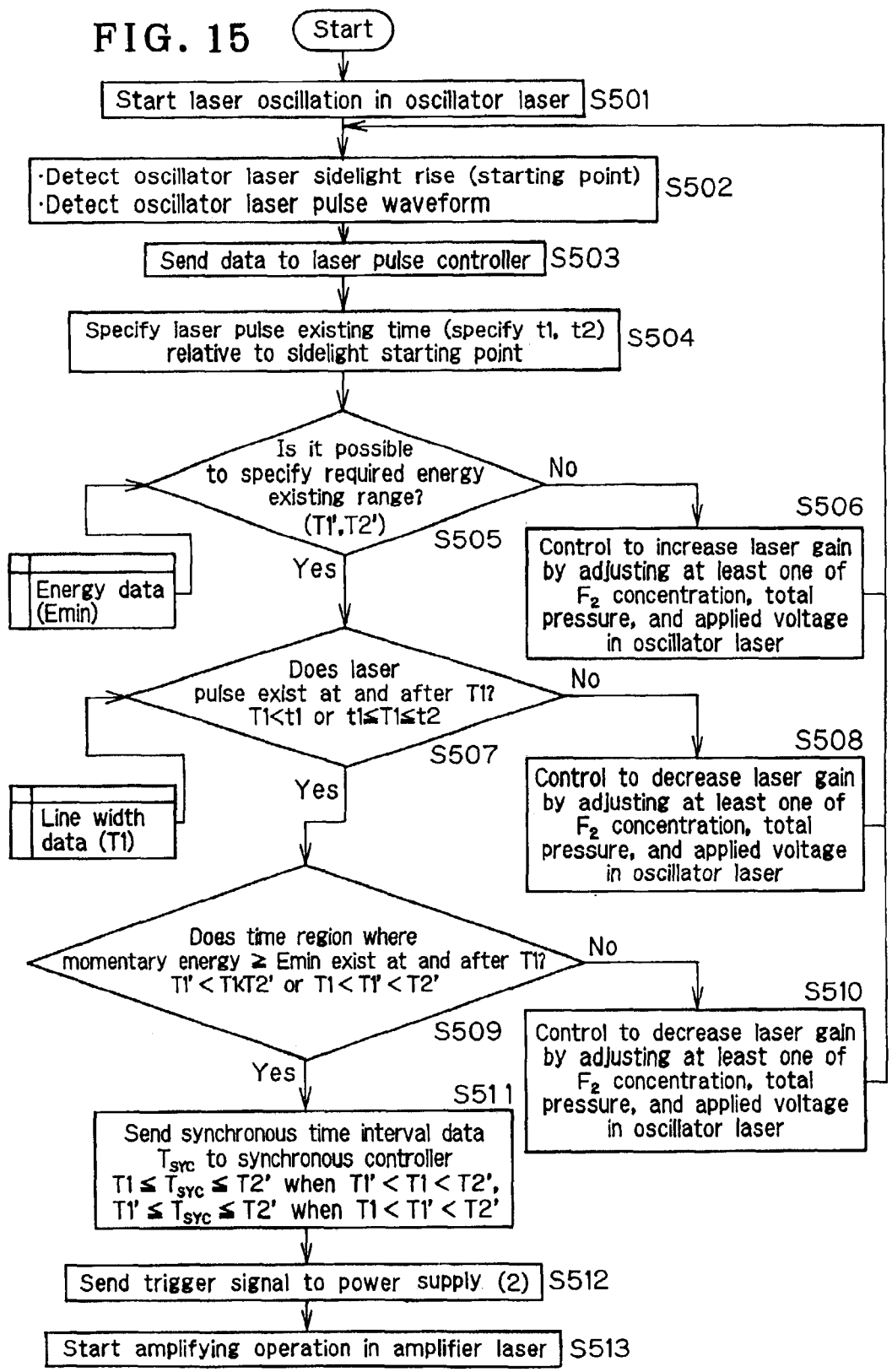
FIG. 15 is a flow chart of an algorithm of a fifth embodiment.

In FIG. 15, the algorithm of the fifth embodiment is shown.

First, at step S501, the laser pulse controller 38 sends a trigger signal to the power supply (1) 7 to apply a high voltage pulse from the power supply (1) 7 to a pair of electrodes 2 of the oscillator laser 10, thus starting the laser oscillation of the oscillator laser 10.

Then, at step S502, the sidelight sensor 32 and the laser pulse sensor 34 detects the sidelight rise (starting point) and the time-related laser pulse waveform, and sends the detected data to the laser pulse controller 38 at the next step S503.

Figure 16:
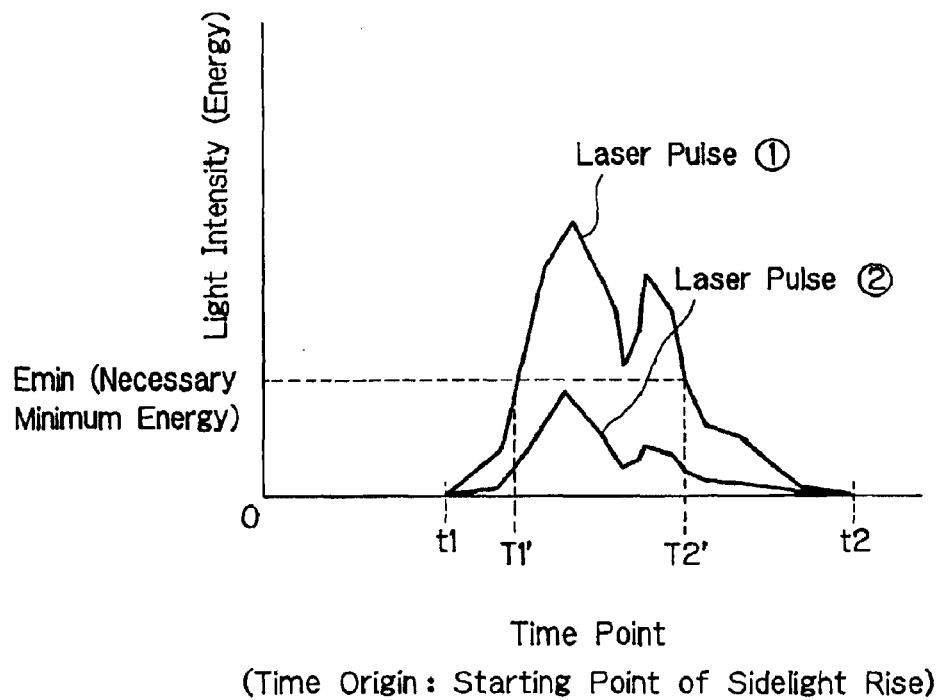
FIG. 16 is a graph showing both cases in which a required energy existing range (T1'–T2') can be specified and in which it can not be specified.

Then, at step S504, the laser pulse controller 38 specifies the time points of starting point and end point of the laser pulse waveform (t1, t2) relative to the sidelight starting point as time origin, from the received data of the sidelight rise (starting point) and the time-related laser pulse waveform. As to t1 and t2, see FIG. 16 for instance.

Then, at step S505, the laser pulse controller 38 determines whether required energy existing range (T1'-T2') can be specified or not in the laser pulse waveform of the oscillator 10, using the above described received data and the data of the minimum required energy $E_{min}$ previously stored in the laser pulse controller 38 or outside of it. As to T1' and T2', see FIG. 16 for instance.

When it is determined in step S505 that the required energy existing range (T1'-T2') does not exist in the above described laser pulse waveform relative to the sidelight starting point as time origin (laser pulse ② in FIG. 16), an amplified laser beam can not be taken out by injecting the oscillator laser pulse into the amplifier laser 20. Therefore, the light intensity of the amplifier laser pulse must be increased. For this purpose, at step S506, at least one of $F_2$ concentration in laser gas filled in the laser chamber 1 of the oscillator laser 10, laser gas total pressure, and applied voltage to a pair of electrodes 2 is adjusted.

At step S506, when the applied voltage is controlled, the laser pulse controller 38 sends a command to the power supply (1) 7 to increase the applied voltage to the electrodes 2 by a predetermined value.

At step S506, when the $F_2$ concentration is controlled, the laser pulse controller 38 sends a command to the gas controller 37 to increase the $F_2$ concentration. On receiving the command, the gas controller 37 opens the valve V2 to replenish diluted $F_2$ gas into the laser chamber 1 while monitoring the pressure data from the pressure gauge 40, and closes the valve V2 after a predetermined volume of gas has been replenished. In this state, the laser gas pressure is increased corresponding to the replenished volume of diluted $F_2$ gas. Therefore, the gas controller opens the valve V3 to exhaust laser gas by a predetermined volume while monitoring the pressure gauge 40, and closes the valve V3 after the laser gas pressure has been adjusted.

At step S506, when the laser gas pressure is controlled, the laser pulse controller 38 sends a command to the gas controller 37 to increase the laser gas pressure. On receiving the command, the gas controller 37 opens the valve V1 to replenish buffer gas into the laser chamber 1 while monitoring the pressure data from the pressure gauge 40, and closes the valve V1 after a predetermined volume of gas has been replenished. In this state, the $F_2$ concentration in the laser gas is decreased corresponding to the replenished volume of buffer gas. When the $F_2$ concentration is to be maintained, the gas controller opens the valve V2 to replenish diluted $F_2$ gas while monitoring the pressure data from the pressure gauge 40, and closes the valve V2 after a predetermined volume of gas has been replenished. When the $F_2$ concentration is not to be maintained, this opening and closing operation of the valve V2 may be omitted.

After completion of step S506, the operations at steps S502–S505 are repeated.

When it is determined at step S505 that the required energy existing range (T1'-T2') exists in the above described laser pulse waveform relative to the sidelight starting point as time origin (laser pulse ① in FIG. 16), the laser pulse controller 38 determines at step S507 whether the oscillator laser pulse exists at and after the time point T1 where the desired spectral line width is reached, using the data of the time points of starting point and end point (t1, t2) of the laser pulse waveform of the oscillator laser 10 specified at step S504, and the data of the time point T1 which is called out from line width characteristic data base stored in the laser pulse controller 38 or outside of it. Thus, it determines whether the following equations are satisfied or not:

$$T1 < t1 \tag{3}$$

or, $$t1 \leq T1 \leq t2 \tag{4}$$

Figure 17:
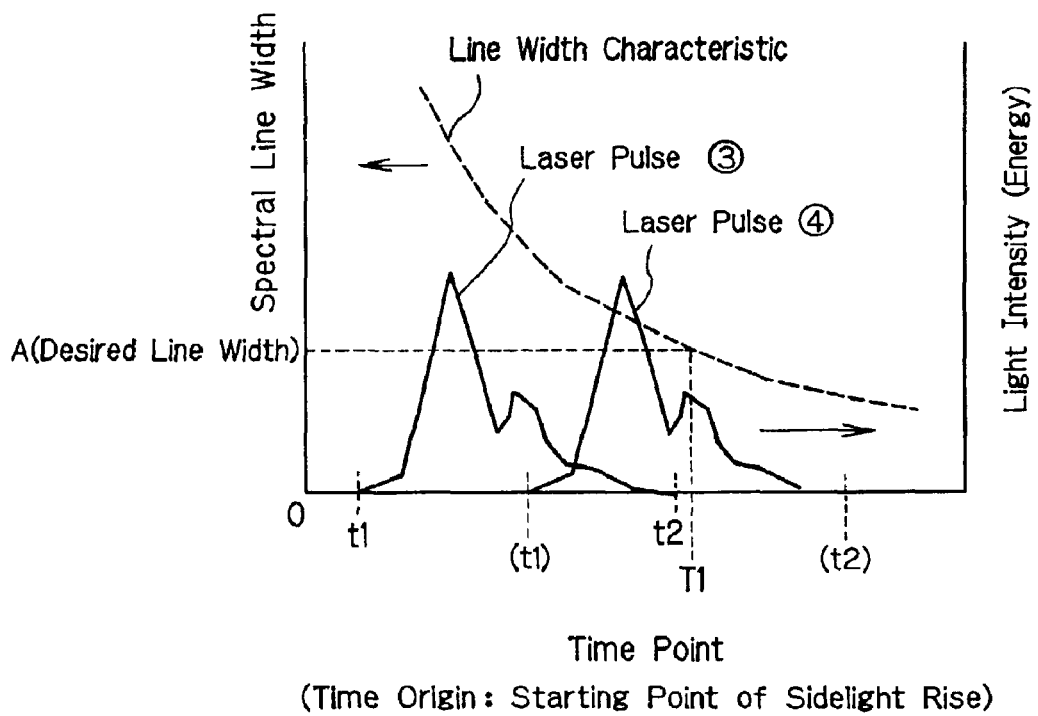
FIG. 17 is a graph showing both cases in which an oscillator laser pulse exists and in which it does not exist at and after a time point T1.

If it is determined that equations (3) or (4) is not satisfied (laser pulse ③ (in FIG. 17), the desired spectral line width A in the amplified laser beam can not be realized by injection of the oscillator laser pulse as seed laser pulse to the amplifier laser 20 in spite of the existence of the required energy existing range in the oscillator laser pulse. Therefore, it is necessary to delay the rise time point t1 of the oscillator laser pulse. For this purpose, at least one of $F_2$ concentration in laser gas filled in the laser chamber 1 of the oscillator laser 10, laser gas total pressure, and voltage applied to a pair of electrodes 2 is adjusted at step S508.

At step S508, when the applied voltage is controlled, a decrease of the applied voltage causes a decrease of laser gain, which in turn causes a delay of the starting point of laser pulse. Thus, the laser pulse controller 38 sends a command to the power supply (1) 7 to decrease the applied voltage to the electrodes 2 by a predetermined value, thus decreasing the applied voltage.

At step S508, when the $F_2$ concentration is controlled, a decrease of the $F_2$ concentration causes a decrease of laser gain, which in turn causes a delay of the starting point of laser pulse. Thus, the laser pulse controller 38 sends a command to the gas controller 37 to decrease the $F_2$ concentration. On receiving the command, the gas controller 37 opens the valve V3 to exhaust laser gas from the laser chamber 1 while monitoring the pressure data from the pressure gauge 40, and closes the valve V3 when the laser gas pressure has fallen to a predetermined value. Then, the gas controller 37 opens the valve V1 (at this time the valve V2 is closed) to replenish buffer gas in the laser chamber 1 while monitoring the pressure data from the pressure gauge 40, and closes the valve V1 when the laser gas pressure has risen to a predetermined value. Thus, by exhausting a predetermined volume of laser gas and filling the same volume of buffer gas, the $F_2$ concentration in laser gas is decreased.

At step S508, when the laser gas pressure is controlled, a decrease of total pressure causes a decrease of $F_2$ concentration, which in turn causes a decrease of laser gain, which in turn causes a delay of the starting point of laser pulse. The laser pulse controller 38 sends a command to the gas controller 37 to decrease the laser gas pressure. On receiving the command, the gas controller 37 opens the valve V3 to exhaust laser gas from the laser chamber 1 while monitoring the pressure data from the pressure gauge 40, and closes the valve V3 when the laser gas pressure has fallen to a predetermined value.

After completion of step S508, the operations of S502–S507 are repeated.

When it is determined at step S507 that the oscillator laser pulse exists at and after the time point T1, that is, the equations (9) or (10) is satisfied (laser pulse ① in FIG. 17 for instance), the laser pulse controller 38 determines at step S509 whether a time region in which the momentary energy$\geq E_{min}$ applies exists at and after the time point T1 in the laser pulse waveform of the oscillator laser 10, using the above described required energy existing range (T1'–T2') and the data of the time point T1 at which the desired spectral line width is reached which is called out from the data base of line width characteristic stored in the laser pulse controller 38 or outside of it. Thus it determines whether the following equation:

$$T1' < T1 < T2' \tag{13}$$

or, $$T1 < T1' < T2' \tag{14}$$

is satisfied, as in FIG. 11 or FIG. 12.

If it is determined here that the equation (13) or (14) is not satisfied (laser pulse ③ in FIG. 17), the amplified laser beam having a desired spectral line width A can not be realized by injection of the oscillator laser pulse as seed laser pulse into the amplifier laser 20, in spite of the existence of the required energy existing range (T1'–T2') in the oscillator laser pulse, and of the existence of the oscillator laser pulse at and after the time point T1. Therefore, it is necessary to delay the rise time point t1 of the oscillator laser pulse. For this purpose, at least one of $F_2$ concentration in laser gas filled in the laser chamber 1 of the oscillator laser 10, laser gas total pressure, and voltage applied to a pair of electrodes 2 is adjusted at step S510.

Step S510 is an equivalent control as the step 508. After completion of step S510, the operations of steps S502–S509 are repeated.

If it is determined that the time region in which the momentary energy$\geq E_{min}$ applies exists in the waveform of the oscillator laser 10 at or after the time point T1 (FIG. 11 and FIG. 12, for instance), the laser pulse controller 38 calculates at step S511 the time interval $T_{SYC}$ for the synchronous oscillation of the amplifier laser 20, and sends the calculated data to the synchronous controller 39.

In addition, in case that there are a plurality of time ranges in which the momentary energy$\geq E_{min}$ applies exists as shown in FIG. 14, an arbitrary one of them may be selected. As to the selection criteria, for instance, the latest existing range relative to the sidelight starting point of the oscillator laser 10 in the above described plurality of ranges may be selected. Alternatively, the range having the longest time interval may be selected.

Then, at step S512, the synchronous controller 39 sends a trigger signal to the power supply (2) 7' so that the discharge is started in the amplifier laser 20 within the synchronous time interval $T_{SYC}$, followed by step S513 at which a high voltage pulse is applied from the power supply (2) 7' to a pair of electrodes 2 of the amplifier laser 20, thus starting the amplifying operation in the amplifier laser 20.

In this algorithm of the fifth embodiment, the time range within which the minimum required energy $E_{min}$ exists is also considered, which enables a reliable synchronization.

Now, an example of a specific $F_2$ laser operation according to the above described present invention will be described in the following.

Figure 18:
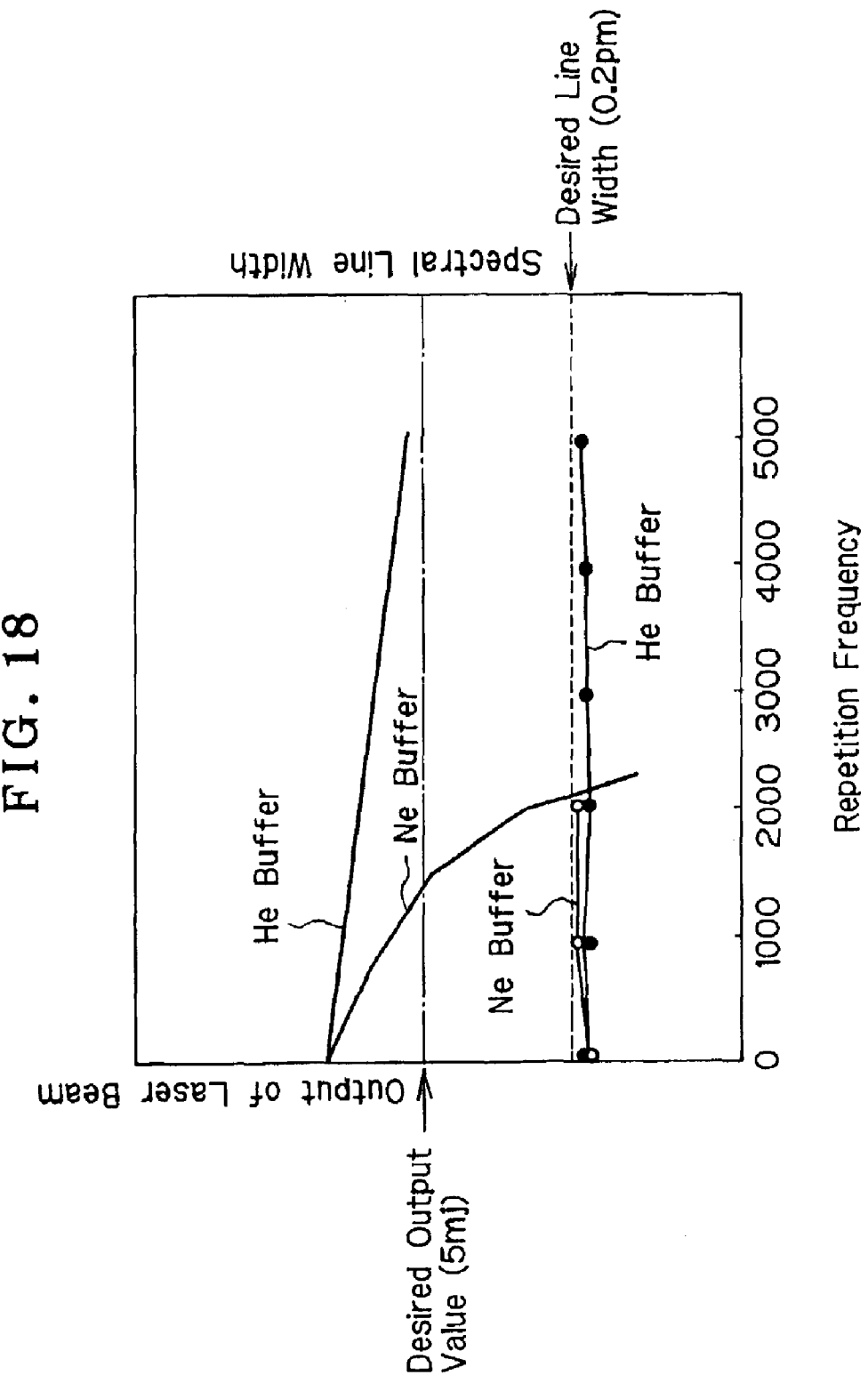
FIG. 18 is a graph showing an operation result of an $F_2$ laser device using either He or Ne buffer gas in the oscillator laser and using a variation example of the algorithm of the first embodiment.

An $F_2$ laser device was operated applying the variation example (FIG. 3, FIG. 7) of the algorithm of the first embodiment above described, and using He or Ne as buffer gas for the oscillator laser 10. The result is shown in FIG. 18.

Here, the $F_2$ concentration was 0.05–0.1% for both the oscillator laser 10 and the amplifier laser 20, buffer gas used in the amplifier laser 20 was He, and the laser gas pressure was 3000 hPa. By applying the variation example of the algorithm of the first embodiment, the spectral line width of the laser pulse emitted from the amplifier laser 20 could be maintained at a desired spectral line width (0.2 pm) or narrower.

However, when the repetition frequency surpasses 2 kHz, and when Ne gas was used as buffer gas in the oscillator laser 10, the output of the laser beam taken out of the amplifier laser 20 fell below desired value (5 mJ).

This is because of the following factors, as previously described. Due to a difference in gas characteristics such as discharge resistance, Ne gas is more subject to field concentration at discharge in comparison with He gas, which leads to an unstable discharge especially in high repetition rate. Further, the heavier mass of Ne gas in comparison with He gas makes high rate circulation of gas in the laser chamber by cross flow fan difficult. Consequently, the gas replacement in the discharge region which is effected by gas circulation between discharges becomes insufficient in high repetition rate, which also leads to an unstable discharge. It is thought that these combined factors decreased the output of seed laser beam from the oscillator laser 10.

On the other hand, when He gas is used as buffer gas in the oscillator laser 10, the output of laser beam taken out of the amplifier laser 20 was kept at the desired value or higher at least up to a repetition frequency of 5 kHz.

Figure 19:
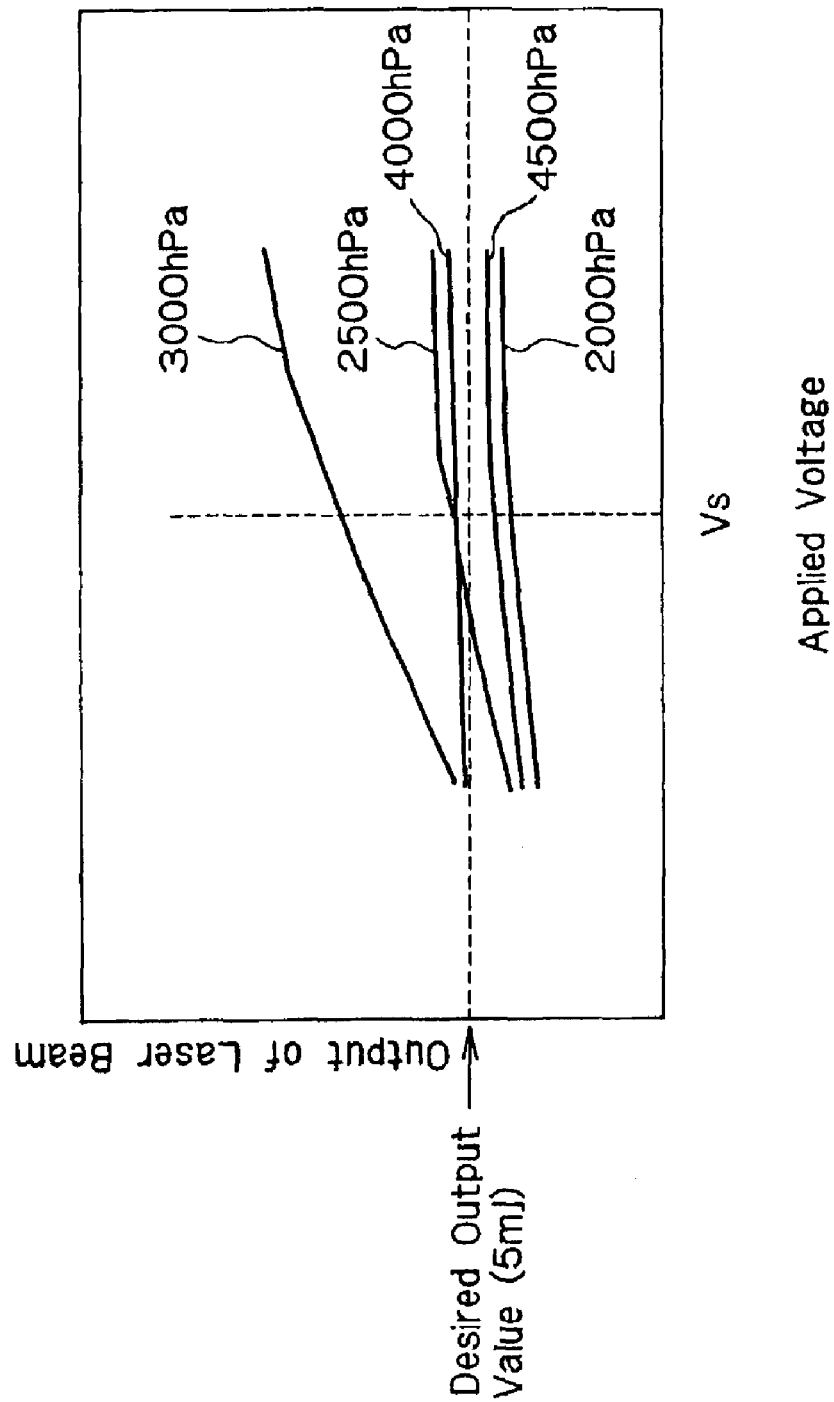
FIG. 19 is a graph showing an operation result of an $F_2$ laser device using He buffer gas in the oscillator laser and using a variation example of the algorithm of the first embodiment, in order to observe the pressure characteristic of laser gas in the amplifier laser.

Then, in order to observe the laser gas pressure characteristic of the amplifier laser 20, an $F_2$ laser device was operated using the variation example of the algorithm of the first embodiment above described, and using He as buffer gas for the oscillator laser 10. The result is shown in FIG. 19.

Here, the $F_2$ concentration was 0.05–0.1% and buffer gas used was He gas for both the oscillator laser 10 and the amplifier laser 20. Although not shown in the graph, the spectral line width of laser pulse emitted from the amplifier laser 20 at various conditions was kept at the desired spectral line width (0.2 pm) or narrower.

When the applied voltage Vs to the main electrodes 2 of the amplifier laser 20 was equal to or higher than 20 kV, and the laser gas pressure in the amplifier laser 20 is in a range of 2500–4000 hPa, the output of the laser beam surpassed the desired value (5 mJ).

However, when the laser gas pressure was below 2500 hPa (2000 hPa in FIG. 19), the output of the laser beam taken out of the amplifier laser 20 fell below the desired value (5 mJ).

The reason why the desired output is not obtained when the laser gas pressure is below 2500 hPa (2000 hPa in FIG. 19) even when the applied voltage Vs to the main electrodes 2 of the amplifier laser 20 is equal to or higher than 20 kV is that a sufficient number of molecules necessary for laser oscillation by induced emission do not exist in laser gas.

On the other hand, the reason why the desired output is not obtained when the laser gas pressure is over 4000 hPa (4500 hPa in FIG. 19) even when the applied voltage Vs to the main electrodes 2 of the amplifier laser 20 is equal to or higher than 20 kV is that the field concentration tends to occur at the discharge, leading to an unstable discharge and insufficient energy injection into laser gas.

In addition, the two stage laser system according to the present invention described above is not limited to $F_2$ laser device, but it can be applied to KrF laser device and ArF laser device, while enabling to obtain laser beam having a spectral line width demanded from an exposure device or narrower, and a pulse energy of 5 mJ or higher.

The two stage laser system according to the present invention has been described in the above, based on its principle and embodiments. However, the present invention is not limited to these embodiments and various variations may be made.

According to the present invention, a two stage laser system such as injection locking laser system or MOPA system in which two or more lasers including oscillator laser and amplifier laser are used is provided, wherein desired spectral line width or spectral purity can be obtained at high output even when the integrated spectral characteristic of oscillator laser does not have desired spectral line width or spectral purity. Especially in $F_2$ laser system, it becomes possible to use He buffer gas in an ultra narrow band oscillator laser.

What is claimed is:

1. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a synchronous time interval having a predetermined spectral line width and/or a predetermined spectral purity exists in the laser pulse from said oscillator laser device, and the system is set such that a discharge occurs in said amplifier laser device within said synchronous time interval.

2. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein when a time point at which an emission caused by a discharge in said oscillator laser device occurs is regarded as time origin, a time point of laser pulse generation relative to said time origin and a laser pulse width in said oscillator laser device are set such that a previously determined synchronous time interval substantially coincides with an actual synchronous time interval within which a time point having a predetermined spectral line width and/or a predetermined spectral purity exists in the laser pulse from said oscillator laser device, and the system is set such that a discharge occurs in said amplifier laser device within said previously determined synchronous time interval.

3. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device, a laser pulse measuring device which measures a time-related pulse waveform of laser beam, and a first controller which can control at least one of applied voltage to the discharge electrodes, fluorine concentration in laser gas, and laser gas pressure in said oscillator laser device, said amplifier laser device comprises a second controller which controls the discharge generation in said amplifier laser device, said first controller uses the data from said discharge emission measuring device and the data from said laser pulse measuring device to set a laser pulse generation time point relative to a time origin and a laser pulse width in said oscillator laser device, said time origin being a time point at which an emission caused by a discharge in said oscillator laser device occurs, by controlling at least one of applied voltage to the discharge electrodes, fluorine concentration in laser gas, and laser gas pressure in said oscillator laser device, said setting being made in such a manner that a predetermined synchronous time interval substantially coincides with an actual synchronous time interval within which a time point having a predetermined spectral line width and/or a predetermined spectral purity exists in the laser pulse from said oscillator laser device, and said second controller controls such that a discharge occurs in the amplifier laser device within said previously determined synchronous time interval.

4. A two stage laser system as claimed in claim 3, wherein the control by said first controller and the control by said second controller are performed in parallel.

5. A two stage laser system as claimed in claim 3, wherein after the control by said first controller is performed for a predetermined time interval, the control by said first controller and the control by said second controller are performed in parallel.

6. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device, a laser pulse measuring device which measures a time-related pulse waveform of laser beam, and a first controller which can control at least one of applied voltage to the discharge electrodes, fluorine concentration in laser gas, and laser gas pressure in said oscillator laser device, said amplifier laser device comprises a laser spectrum sensor which detects spectral line width and/or spectral purity of laser pulse projected from the amplifier laser and a second controller which controls the discharge generation in said amplifier laser device, said first controller uses the data from said discharge emission measuring device and the data from said laser pulse measuring device to set a laser pulse generation time point relative to a time origin and a laser pulse width in said oscillator laser device, said time origin being a time point at which an emission caused by a discharge in said oscillator laser device occurs, by controlling at least one of applied voltage to the discharge electrodes, fluorine concentration in laser gas, and laser gas pressure in said oscillator laser device, said setting being made such that a previously determined synchronous time interval substantially coincides with an actual synchronous time interval within which a time point having a predetermined spectral line width and/or a predetermined spectral purity exists in the laser pulse from said oscillator laser device, after said setting, said second controller controls such that a discharge occurs in said amplifier laser device within said previously determined synchronous time interval, and when detected data of said laser spectrum sensor is not at a predetermined value or it is outside a predetermined range, said first controller resets said setting of the laser pulse from said oscillator laser device.

7. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device, a laser pulse measuring device which measures a time-related pulse waveform of laser beam, and a first controller which can control at least one of applied voltage to the discharge electrodes, fluorine concentration in laser gas, and laser gas pressure in said oscillator laser device, said amplifier laser device comprises a laser spectrum sensor which detects spectral line width and/or spectral purity of laser pulse projected from the amplifier laser and a second controller which controls the discharge generation in said amplifier laser device, said first controller uses the data from said discharge emission measuring device and the data from said laser pulse measuring device to set a laser pulse generation time point relative to a time origin and a laser pulse width in said oscillator laser device, said time origin being a time point at which an emission caused by a discharge in said oscillator laser device occurs, by controlling at least one of applied voltage to the discharge electrodes, fluorine concentration in laser gas, and laser gas pressure in said oscillator laser device, said setting being made such that a previously determined synchronous time interval substantially coincides with an actual synchronous time interval within which a time point having a predetermined spectral line width and/or a predetermined spectral purity exist in the laser pulse from said oscillator laser device, after said setting, said second controller controls such that a discharge occurs in said amplifier laser device within said previously determined synchronous time interval, and when detected data of said laser spectrum sensor is not at a predetermined value or it is outside a predetermined range, said first controller sends a abnormality signal to the outside.

8. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a laser pulse generation time point relative to a discharge emission time point and a spectral line width are set such that a time point having a predetermined spectral line width and/or a predetermined spectral purity exists within the laser pulse from said oscillator laser device, a synchronous time interval within which a time point having a predetermined spectral line width and/or a predetermined spectral purity exists is determined in the laser pulse which is set in said manner, and the system is set such that a discharge occurs within said synchronous time interval in said amplifier laser device.

9. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device, a laser pulse measuring device which measures a time-related pulse waveform of laser beam, and a first controller which can control at least one of applied voltage to the discharge electrodes, fluorine concentration in laser gas, and laser gas pressure in said oscillator laser device, said amplifier laser device comprises a second controller which controls the discharge generation in said amplifier laser device, said first controller uses the data from said discharge emission measuring device and the data from said laser pulse measuring device to set a laser pulse generation time point relative to a discharge emission time point and a laser pulse width in said oscillator laser device, by controlling at least one of applied voltage to the discharge electrodes, fluorine concentration in laser gas, and laser gas pressure in said oscillator laser device, said setting being made such that a time point having a predetermined spectral line width and/or a predetermined spectral purity exists in the laser pulse from said oscillator laser device, said first controller then determining a synchronous time interval within which a time point having a predetermined spectral line width and/or a predetermined spectral purity exists in the laser pulse which is set in said manner, and sending the data of the synchronous time interval to said second controller, and said second controller controls such that a discharge occurs within said synchronous time interval in said amplifier laser device, based on the synchronous time interval data from said first controller.

10. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a pulse energy of the laser beam emitted from said oscillator laser is maintained at a predetermined value, said synchronous time interval is determined from operation conditions of said oscillator laser device based on a correlation table between at least one operation condition of applied voltage to the discharge electrode, fluorine concentration in laser gas, and laser gas pressure in said oscillator laser device, and a synchronous time interval within which a time point having a predetermined spectral line width and/or a predetermined spectral purity exists in the laser pulse from said oscillator laser device, and the system is set such that a discharge occurs in said amplifier laser device within said synchronous time interval.

11. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a first controller and a laser pulse sensor which measures pulse energy of laser beam, said amplifier laser device comprises a second controller which controls the discharge generation in said amplifier laser device, a correlation table between at least one operation condition of applied voltage to the discharge electrode, fluorine concentration in laser gas, and laser gas pressure in said oscillator laser device, and a synchronous time interval within which a time point having a predetermined spectral line width and/or a predetermined spectral purity exists in the laser pulse from said oscillator laser device is stored in said second controller, said first controller controls at least one of applied voltage to the discharge electrode, fluorine concentration in laser gas, and laser gas pressure in said oscillator laser device to maintain the pulse energy of laser emitted from said oscillator laser device at a predetermined value, said first controller then sending at least one of the operation condition data of applied voltage to the discharge electrode, fluorine concentration in laser gas, and laser gas pressure in said oscillator laser device to said second controller, and said second controller determines a synchronous time interval from operation data from said first controller and said correlation table and controls said amplifier laser device such that a discharge occurs in said amplifier laser device within said synchronous time interval.

12. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein a time region within which a predetermined level of momentary energy is surpassed in the laser pulse from said oscillator laser device is determined, and a laser pulse generation time point relative to a discharge emission time point and a laser pulse width are set such that a time point having a predetermined spectral line width and/or a predetermined spectral purity exists in this time region, a synchronous time interval within which a time point having a predetermined spectral line width and/or a predetermined spectral purity exists is determined in the laser pulse which is set in said manner, and the system is set such that a discharge occurs in said amplifier laser device within said synchronous time interval.

13. A two stage laser system comprising an oscillator laser device which has discharge electrodes within a laser chamber filled with laser gas containing $F_2$ and emits a laser beam which is band-narrowed by means of a band narrowing module including a wavelength selection element arranged in a laser resonator, and an amplifier laser device which has discharge electrodes within a laser chamber filled with laser gas containing $F_2$ and amplifies the laser pulse injected from said oscillator laser device, wherein said oscillator laser device comprises a discharge emission measuring device, a laser pulse measuring device which measures a time-related pulse waveform of laser beam, and a first controller which can control at least one of applied voltage to the discharge electrodes, fluorine concentration in laser gas, and laser gas pressure in said oscillator laser device, said amplifier laser device comprises a second controller which controls the discharge generation in said amplifier laser device, said first controller uses the data from said discharge emission measuring device and the data from said laser pulse measuring device to determine a time region within which a predetermined level of momentary energy is surpassed in the laser pulse from said oscillator laser device and to set a laser pulse generation time point relative to a discharge emission time point and a laser pulse width in said oscillator laser device, by controlling at least one of applied voltage to the discharge electrodes, fluorine concentration in laser gas, and laser gas pressure in said oscillator laser device, said setting being made such that a time point having a predetermined spectral line width and/or a predetermined spectral purity exists in said time region, said first controller then determining a synchronous time interval within which a time point having a predetermined spectral line width and/or a predetermined spectral purity exists in the laser pulse which is set in said manner, and sending the data of the synchronous time interval to said second controller, and said second controller controls such that a discharge occurs within said synchronous time interval in said amplifier laser device, based on the synchronous time interval data from the first controller.

14. A two stage laser system as claimed in any one of claims 1 through 13, wherein the discharge is generated in said amplifier laser device at a time point of ½ of said synchronous time interval.

15. A two stage laser system as claimed in any one of claims 1 through 14, wherein said two stage laser system comprises any one of KrF laser system, ArF laser system, and $F_2$ laser system.

16. A two stage laser system as claimed in claim 15, wherein said two stage laser system comprises a $F_2$ laser device, and buffer gas contained in laser gas in said oscillator laser device is helium gas.

17. A two stage laser system as claimed in any one of claims 1 through 16, wherein said two stage laser system comprises a $F_2$ laser device, the applied voltage to the discharge electrodes of said amplifier laser is 20 kV or higher, and the laser gas pressure is in a range of 2500–4000 hPa.

* * * * *